US008042049B2

(12) United States Patent
Killian et al.

(10) Patent No.: US 8,042,049 B2
(45) Date of Patent: Oct. 18, 2011

(54) USER INTERFACE FOR MULTI-DEVICE CONTROL

(75) Inventors: David Killian, Lake Worth, FL (US); Glenn Harter, Wellington, FL (US); Justin Flores, West Palm Beach, FL (US); Paul Krzyzanowski, Fanwood, NJ (US)

(73) Assignee: OpenPeak Inc., Boca Raton, FL (US)

( * ) Notice: Subject to any disclaimer, the term of this patent is extended or adjusted under 35 U.S.C. 154(b) by 321 days.

(21) Appl. No.: 10/783,511

(22) Filed: Feb. 23, 2004

(65) Prior Publication Data

US 2005/0097478 A1    May 5, 2005

Related U.S. Application Data

(60) Provisional application No. 60/516,302, filed on Nov. 3, 2003.

(51) Int. Cl.
*G06F 3/00* (2006.01)
(52) U.S. Cl. ........ 715/740; 715/733; 715/771; 715/970; 700/9; 709/208; 709/218; 340/3.1
(58) Field of Classification Search .................... 715/740
See application file for complete search history.

(56) References Cited

U.S. PATENT DOCUMENTS

| | | | |
|---|---|---|---|
| 5,414,426 A | 5/1995 | O'Donnell et al. |
| 5,519,878 A | 5/1996 | Dolin, Jr. |
| 5,537,463 A | 7/1996 | Escobosa et al. |
| 5,552,917 A | 9/1996 | Darbee et al. |
| 5,570,085 A | 10/1996 | Bertsch |
| 5,689,353 A | 11/1997 | Darbee et al. |
| 5,802,467 A | 9/1998 | Salazar et al. |
| 5,805,812 A | 9/1998 | Fish et al. |
| 5,875,108 A | 2/1999 | Hoffberg et al. |
| 5,898,386 A | 4/1999 | Kaihatsu |
| 5,926,108 A | 7/1999 | Wicks et al. |
| 5,930,699 A | 7/1999 | Bhatia |
| 5,953,144 A | 9/1999 | Darbee et al. |
| 5,956,025 A | 9/1999 | Goulden et al. |
| 5,956,487 A | 9/1999 | Venkatraman et al. |
| 5,959,751 A | 9/1999 | Darbee et al. |
| 5,963,624 A | 10/1999 | Pope |

(Continued)

OTHER PUBLICATIONS

*Total Remote Software: Griffin Technology Downloads*, 1 page, printed from Internet- URL-http://www.griffintechnology.com/software/software_totalremote.html, (printed Feb. 23, 2004).

(Continued)

*Primary Examiner* — Alvin Tan
(74) *Attorney, Agent, or Firm* — Sterne, Kessler, Goldstein & Fox P.L.L.C.

(57) ABSTRACT

A control server, or similar central processor, manages the distribution of data (including audio and video), voice, and control signals among a plurality of system components connected via a wired and/or wireless communications network. The system components include audio/visual components (such as, televisions, monitors, PDAs, notepads, notebooks, MP3, portable stereo, etc.) as well as household appliances (such as, lighting, ovens, alarm clocks, etc.). A portable controller allows a user to access and control the system components from any location within a controlled residential and/or non-residential environment, including its surrounding areas. The portable controller includes a user and management interface that contains customized control screens for the system components. The control screens are stored in a hierarchical architecture that is searchable by region or component type.

19 Claims, 14 Drawing Sheets

FIG. 5

U.S. PATENT DOCUMENTS

| | | | |
|---|---|---|---|
| 6,005,861 A | 12/1999 | Humpleman | |
| 6,020,881 A * | 2/2000 | Naughton et al. | 715/740 |
| 6,026,150 A | 2/2000 | Frank et al. | |
| 6,032,202 A | 2/2000 | Lea et al. | |
| 6,049,711 A | 4/2000 | Ben-Yehezkel et al. | |
| 6,052,750 A | 4/2000 | Lea | |
| 6,085,236 A | 7/2000 | Lea | |
| 6,131,028 A | 10/2000 | Whitington | |
| 6,148,205 A | 11/2000 | Cotton | |
| 6,154,745 A | 11/2000 | Kari et al. | |
| 6,167,046 A | 12/2000 | Terada et al. | |
| 6,170,007 B1 | 1/2001 | Venkatraman et al. | |
| 6,198,479 B1 | 3/2001 | Humpleman et al. | |
| 6,199,136 B1 | 3/2001 | Shteyn | |
| 6,208,341 B1 | 3/2001 | Van Ee et al. | |
| 6,208,866 B1 | 3/2001 | Rouhollahzadeh et al. | |
| 6,218,931 B1 | 4/2001 | Asghar et al. | |
| 6,223,348 B1 | 4/2001 | Hayes et al. | |
| 6,243,707 B1 | 6/2001 | Humpleman et al. | |
| 6,243,772 B1 | 6/2001 | Ghori et al. | |
| 6,259,707 B1 | 7/2001 | Dara-Abrams et al. | |
| 6,266,612 B1 | 7/2001 | Dussell et al. | |
| 6,275,865 B1 | 8/2001 | Zou | |
| 6,282,714 B1 | 8/2001 | Ghori et al. | |
| 6,288,716 B1 | 9/2001 | Humpleman et al. | |
| 6,292,554 B1 | 9/2001 | Oden et al. | |
| 6,317,028 B1 | 11/2001 | Valiulis | |
| 6,317,718 B1 | 11/2001 | Fano | |
| 6,321,092 B1 | 11/2001 | Fitch et al. | |
| 6,349,352 B1 | 2/2002 | Lea | |
| 6,359,636 B1 | 3/2002 | Schindler et al. | |
| 6,363,434 B1 | 3/2002 | Eytchison | |
| 6,388,399 B1 | 5/2002 | Eckel et al. | |
| 6,405,261 B1 | 6/2002 | Gaucher | |
| 6,463,343 B1 | 10/2002 | Emens et al. | |
| 6,496,135 B1 | 12/2002 | Darbee | |
| 6,563,430 B1 | 5/2003 | Kemink et al. | |
| 6,587,067 B2 | 7/2003 | Darbee et al. | |
| 6,600,421 B2 | 7/2003 | Freeman | |
| 6,642,852 B2 | 11/2003 | Dresti et al. | |
| 6,680,730 B1 * | 1/2004 | Shields et al. | 345/169 |
| 6,734,879 B2 * | 5/2004 | Hasha et al. | 715/737 |
| 6,756,998 B1 * | 6/2004 | Bilger | 715/764 |
| 6,941,356 B2 * | 9/2005 | Meyerson | 709/220 |
| 7,027,881 B2 * | 4/2006 | Yumoto et al. | 700/65 |
| 7,047,092 B2 * | 5/2006 | Wimsatt | 700/83 |
| 7,073,130 B2 * | 7/2006 | Novak et al. | 715/744 |
| 7,131,058 B1 * | 10/2006 | Lapstun et al. | 715/501.1 |
| 7,358,956 B2 * | 4/2008 | Hinckley et al. | 345/156 |
| 7,360,159 B2 * | 4/2008 | Chailleux | 715/709 |
| 7,668,990 B2 | 2/2010 | Krzyzanowski et al. | |
| 2001/0018663 A1 | 8/2001 | Dussell et al. | |
| 2001/0036192 A1 | 11/2001 | Chiles et al. | |
| 2001/0041561 A1 | 11/2001 | Ventulett et al. | |
| 2001/0049275 A1 | 12/2001 | Pierry et al. | |
| 2001/0049846 A1 | 12/2001 | Guzzi et al. | |
| 2001/0053274 A1 | 12/2001 | Roelofs et al. | |
| 2001/0054060 A1 | 12/2001 | Fillebrown et al. | |
| 2001/0055954 A1 | 12/2001 | Cheng | |
| 2002/0006788 A1 | 1/2002 | Knutsson et al. | |
| 2002/0019984 A1 | 2/2002 | Rakib | |
| 2002/0022991 A1 | 2/2002 | Sharood et al. | |
| 2002/0031120 A1 | 3/2002 | Rakib | |
| 2002/0033760 A1 | 3/2002 | Kobayashi | |
| 2002/0034292 A1 | 3/2002 | Tuoriniemi et al. | |
| 2002/0035403 A1 | 3/2002 | Clark et al. | |
| 2002/0035404 A1 | 3/2002 | Ficco et al. | |
| 2002/0035605 A1 | 3/2002 | McDowell et al. | |
| 2002/0035621 A1 | 3/2002 | Zintel et al. | |
| 2002/0036795 A1 | 3/2002 | Fujitani | |
| 2002/0044042 A1 | 4/2002 | Christensen et al. | |
| 2003/0011635 A1 | 1/2003 | Hasha et al. | |
| 2003/0103088 A1 | 6/2003 | Dresti et al. | |
| 2004/0003073 A1 | 1/2004 | Krzyzanowski et al. | |
| 2004/0046677 A1 | 3/2004 | Dresti et al. | |
| 2004/0207766 A1 | 10/2004 | Sata et al. | |

OTHER PUBLICATIONS

*Total Remote v2.0 user guide*, 29 pages, printed from Internet- URL- http://www.griffintechnology.com/downloads/pdf/manuals/Total_Remote_user_manual.pdf, (printed Feb. 23, 2004).

International Search Report for International Application No. PCT/US03/20189, Issued on Oct. 29, 2003.

International Search Report mailed Oct. 20, 2006 for International Application No. PCT/US04/36496, 1 pg.

Supplementary European Search Report mailed Mar. 5, 2010 for European Application No. 04800615.9-2211, 4 pgs.

Jahnke, Jens H. et al., "Facilitating the Programming of the Smart Home", *IEEE Wireless Communications*, Dec. 2002, pp. 70-76, vol. 9, No. 6, IEEE Service Center, Piscataway, NJ, US.

Kim, Seungcheon et al., "Home Networking Digital TV Based on LnCP", *IEEE Transactions on Consumer Electronics*, Nov. 2002, pp. 990-996, vol. 48, No. 4, IEEE Service Center, US.

Kushiro, Noriyuki et al., "Integrated Residential Gateway Controller for Home Energy Management System", *IEEE Transactions on Consumer Electronics*, Aug. 2003, pp. 629-636, vol. 49, No. 3, IEEE Service Center, New York, NY, US.

Kang, Soon Ju et al., "Room-Bridge: Vertically Configurable Network Architecture and Real-Time Middleware for Interoperability between Ubiquitous Consumer Devices in the Home", *Lecture Notes in Computer Science 2218*, Nov. 12, 2001, pp. 232-251, Springer-Verlag Berline Heidelberg, Berline, Heidelberg.

English Translation of Notice of Preliminary Rejection directed to related Korean Patent Application No. 10-2006-7010823, mailed Mar. 11, 2011, from the Korean Intellectual Property Office; 3 pages.

* cited by examiner

USER INTERFACE FOR MULTI-DEVICE CONTROL

CROSS-REFERENCE TO RELATED APPLICATIONS

This application claims the benefit of U.S. Provisional Application Ser. No. 60/516,302, filed Nov. 3, 2003, by Killian et al., entitled "User Interface for Multi-Device Control," incorporated herein by reference in its entirety.

The following United States patent applications of common assignee are related to the present application, and are herein incorporated by reference in their entireties:

"Method, System, and Computer Program Product for Managing Controlled Residential or Non-Residential Environments," U.S. patent application Ser. No. 10/382,897, by Krzyzanowski et al., filed Mar. 7, 2003;

"Method, System, and Computer Program Product for Managing Controlled Residential or Non-Residential Environments," U.S. patent application Ser. No. 10/180,500, by Krzyzanowski et al., filed Jun. 27, 2002;

"Method, System, and Computer Program Product for Managing Controlled Residential or Non-Residential Environments," U.S. Provisional Patent Application Ser. No. 60/533,220, by Krzyzanowski et al., filed Dec. 31, 2003; and "Method, System, and Computer Program Product for Managing Controlled Residential or Non-Residential Environments," U.S. patent application Ser. No. 10/782,923, by Krzyzanowski et al., filed concurrently herewith.

BACKGROUND OF THE INVENTION

1. Field of the Invention

The present invention relates generally to a user interface, and more specifically, to a user interface for use in connection with a remote control unit that contains multiple consumer electronic devices.

2. Related Art

User interfaces provide increased flexibility and versatility to remote control units, and can be used to control consumer electronic (CE) devices, such as televisions, digital video device (DVD) players, and compact disc (CD) players. Most remote control units include fixed, "hard key" formats, which cannot be easily reconfigured to support multiple types of CE devices.

Even remote control units that are programmable to support multiple types of devices can be intimidating, confusing, and difficult for the average user to operate, particularly when multiple devices must be programmed to support a single outcome. For example, a device such as a video output device (e.g., television) may accept input from various sources. However, the available input sources may not be readily clear to the user. In addition, when configuring a multi-purpose remote control unit to command multiple devices, the user usually finds it difficult to identify the proper codes for teaching the control unit.

The problem of device management and control takes on added complexity in an environment that includes not only multiple devices, but also multiple groups of device systems.

What is needed is technology for enabling a user interface to manage multi-devices in a clear, intuitive, and simple manner.

SUMMARY OF THE INVENTION

A method, system, and computer program product are provided to manage a plurality of devices and/or applications within a controlled-environment, such as a home, business, school, etc, as well as its surrounding areas. A control center comprises one or more servers or other data processing devices, and enables centralized command and control of the devices and/or applications.

In embodiments of the present invention, a portable controller (such as a personal digital assistant, wireless notepad, etc.) enables a user to interact with the control center. Such interaction includes altering the configuration and performance of the other devices and/or applications. Accordingly, the portable controller provides remote access to other devices and/or applications, and enables the user to control their functions and/or operations from any location within the environment.

In an embodiment, the portable controller is a handheld platform having a graphic display that has wireless connectivity to the control center that controls the other devices and/or applications within the controlled environment via a wireless network (e.g., as specified by IEEE standards 802.11a, 802.11b, 802.11g, etc.). In another embodiment, the control center is built into the portable controller. In another embodiment, the portable controller communicates directly with the other devices and/or applications via infrared (IR) code signals.

According to embodiments of the present invention, the portable controller facilitates control of a system comprising an output component (e.g., television, monitor, etc.) having multiple input components (e.g., DVD, VCR, satellite tuner, digital video recorder (DVR), etc.). In accordance with the present invention, the user first selects an output component via a graphical user interface (GUI) presented on the portable controller. He or she is then presented with a control screen affording the user with the ability to select a specific input component using a "tabbed" interface. When that input is selected, the control screen for that system component is presented.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally or structurally similar elements. Additionally, generally, the leftmost digit(s) of a reference number identifies the drawing in which the reference number first appears.

DETAILED DESCRIPTION OF THE INVENTION

The present invention is directed towards the centralized command and control of a plurality of devices and/or applications within a controlled environment, such as a residence, business, school, etc. A residential controlled environment includes the confines of a home, apartment, mobile home, houseboat, or other types of residences. However in embodiments, a residential environment includes the surrounding area of the residence, as well as any shelters, constructs, improvements, or the like, within a designated perimeter.

In other embodiments, the present invention is implemented in non-residential environments. A non-residential environment includes, but is not limited to, an office complex, suite of small offices, production studio, warehouse, entertainment arena, school or university, health care facility, hotel, vacation resort, aircraft, ship, automobile, or the like. In embodiments, the controlled environment for the non-residential embodiments include not only the actual confines of the aforementioned structures but also their surroundings within a designated perimeter.

Examples of a controlled environment are described in the application entitled "Method, System, and Computer Program Product for Managing Controlled Residential or Non-Residential Environments" (U.S. patent application Ser. No. 10/382,897), and the application entitled "Method, System, and Computer Program Produce for Managing Controlled Residential or Non-Residential Environments," (U.S. patent application Ser. No. 10/180,500), both of which are incorporated herein by reference as though set forth in their entireties. As described in these applications, various methods and systems can be provided to manage the distribution of information (including video, audio, voice, text, graphics, control messages, etc.) to the other devices and/or applications within the controlled environment. Such devices and/or applications include, but are not limited to, communications equipment (such as, telephones, intercoms, etc.), entertainment systems (such as, televisions, CD/DVD players, gaming applications, stereos, etc.), monitoring systems (such as, security cameras, baby monitors, etc.), safety/security systems (such as, fire alarms, sprinkler systems, locks on doors or windows, etc.), personal computers (such as, desktops, notebooks, notepads, personal digital assistants, etc.), cooking appliances (such as, ovens, coffee makers, electrical food/beverage warmers, etc.), comfort systems (such as, heating and air conditioning (HVAC), humidifiers, dehumidifiers, air purifiers, light switches, light dimmers, etc.), power outlets, power supplies, or the like.

Figure 1:
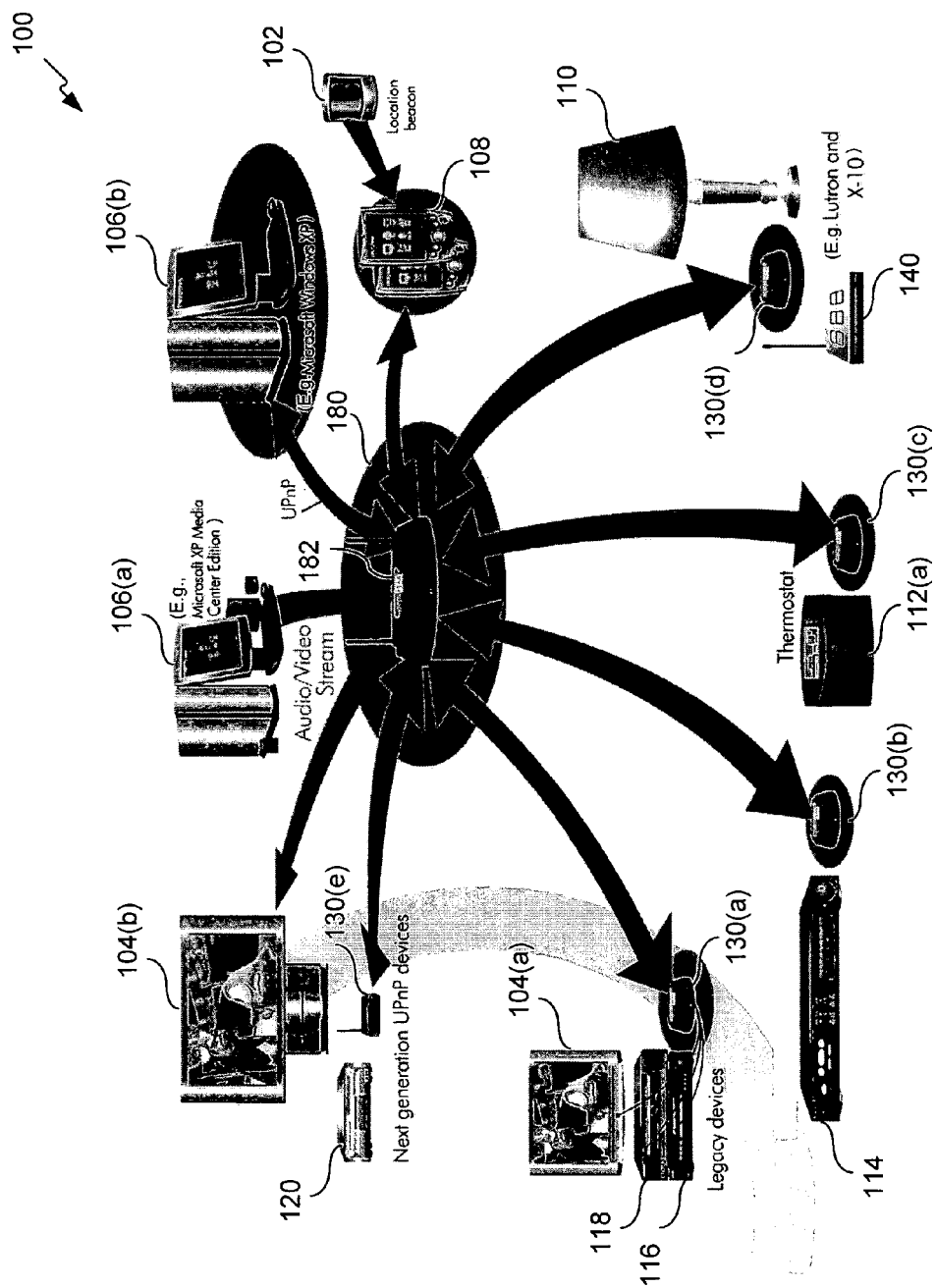
FIG. 1 illustrates a residential controlled system according to an embodiment of the present invention

An example of such controlled environments are shown in FIG. 1, which illustrates a residential controlled system 100 according to an embodiment of the present invention. System 100 includes a communications network 180 that interconnects with a plurality of system components. The system components include a positioning unit 102, two televisions 104 (shown as television 104(a) and 104(b)), two computer clients 106 (shown as computer client 106(a) and computer client 106(b)), a portable controller 108, a lighting device 110, a thermostat 112 for a HVAC system, a tuner 114, a media player 116, a cable box 118, and a DSS box 120. Other devices and/or applications can also be included as system components.

Positioning unit 102 designates spatial locations within the residence that serves as the hosting environment for system 100. Positioning unit 102 is coupled to the other system components (e.g., portable controller 108) via a wired and/or wireless interface. Positioning unit 102 is operable to designate a floor or room within the residence. Positioning unit 102 is also operable to designate a specific location or region within a floor or room. Moreover, positioning unit 102 can be situated outside of the residence to thereby, designate external areas of the residence.

Computer client 106 includes a wired and/or wireless personal computer, personal digital assistant (PDA), enhanced telephone, personal television, or other data processing device linked to communications network 180. As a personal computer, computer client 106 can be a desktop, notebook, notepad, or the like.

Portable controller 108 is a wired and/or wireless data processing device that enables a user to interact with, send control messages to, and/or manage the distribution of information (including audio, video, voice, and other data) among the other system components. Portable controller 108 can be a portable version of the devices listed as computer client 106. For example, portable controller 108 can be a personal notebook or notepad computer, PDA, enhanced telephone, or other device linked to communications network 180 and including a display with the ability to interact with the other system components. Hence, portable controller 108 enables a user to remotely control the operations of various components of system 100. In an embodiment, the display for portable controller 108 is capable of receiving video and/or audio from the other system components. In an embodiment, portable controller 108 includes a flash ROM that enables wireless downloads and/or uploads.

Television 104 is a conventional television. In an embodiment, television 104 is enhanced to support interactive and/or personal services. Personal services include virtual recording, programming, pausing/rewinding live broadcasts, or the like. For example, television 104 can be a personal television enhanced to support the MSN® TV service, hosted by WebTV Networks, Inc. (Mountain View, Calif.), that supports the WEBTV® services available from Microsoft Corporation (Redmond, Wash.). As shown, television 104 can be connected to cable set-top box 118, DSS set-top box 120, and/or media player 116 (e.g., PVR, VCR, or DVD player).

The aforementioned system components are not intended to be exhaustive. Other devices (including appliances), applications, and/or the like can be implemented, including, but not limited to, a refrigerator, stove, microwave, toaster, coffee-maker, alarm clock, humidifiers, sprinkler system, lighting, light dimmers, etc. In an embodiment, portable controller 108 controls the operations and/or functions of such components, such as on/off, timers, modulation (e.g., oven temperatures, etc.), pause, snooze, etc.

As discussed, communications network 180 provides a transmission medium for communicating among the system components. Communications network 180 is a wired and/or wireless local area network (LAN). Thus, communications network 180 includes wired, wireless, or both transmission media, including satellite, terrestrial (e.g., fiber optic, copper, UTP, STP, coaxial, hybrid fiber-coaxial (HFC), or the like), radio, microwave, free-space optics, and/or any other form or method of transmission.

In embodiments, a server polices all traffic among the other system components. As such, the exchange of information among the system components is routed or otherwise controlled via a server. In another embodiment, communications network 180 supports peer-to-peer communications. As such, the system components exchange audio, video, voice, other data, and/or control messages directly with each other and without being centrally managed by a server.

In an embodiment using a wired transmission medium, communications network 180 is an Ethernet LAN having a CAT-5 cable, or the like, distributed to each system component, such as television 104, media player 116, etc. The system component includes an audio/video (AV) connector that is responsive to receive the cable. In an embodiment, communications network 180 includes a telephone line and/or powerline (such as, the communications technologies made available from the Home Phone Networking Alliance (Home-PNA) or the like).

In an embodiment using a wireless transmission medium, communications network 180 supports the IEEE standard 802.11(a), which specifies a wireless Ethernet protocol for large-sized video. In another wireless embodiment, communications network 180 supports the IEEE standard 802.11(b), which specifies a wireless Ethernet protocol for small-size video. In another wireless embodiment, communications network 180 supports the IEEE standard 802.11(g). In another embodiment, the BLUETOOTH™ wireless technology (developed by Bluetooth SIG, Inc.) is used to support short-range wireless interfaces with system 100.

As shown in FIG. 1, communications network 180 includes a wireless network access point 182, such as those available from Linksys Group Inc. (Irvine, Calif.) or Cisco Systems, Inc. (San Jose, Calif.), as a platform for the system components. A wireless access point 182 provides a central point for connectivity in a wireless network and always-on connectivity necessary for tracking states of the system components. Additionally, a wireless access point 182 can provide a connection point between a wired and wireless network. In an embodiment using a server, as discussed above, a wireless access point 182 serves as a platform for the server. In alternative server-based embodiments of the present invention, the server can actually be located on a number of different device platforms in addition to a wireless access point (such as, wireless access point 182 shown at 180), including a bridge device (such as, bridges 130(*a*)-130(*e*)), a personal digital assistant (such as, 108), a personal computer (such as, 106), or the like.

System 100 also includes a plurality of infrared/serial bridges 130(*a*)-130(*d*), which comply with the IEEE 802.11 (b) standard for wireless communications. Each infrared/serial bridge 130 interacts with one or more components. As shown, infrared/serial bridge 130(*a*) interacts with television 104(*a*), cable box 118, and media player 116. Infrared/serial bridge 130(*b*) interacts with tuner 114 or any type of proprietary device that rely on infrared/serial communication protocols as would be apparent to one skilled in the relevant art(s). Infrared/serial bridge 130(*c*) interacts with thermostat 112. Infrared/serial bridge 130(*d*) interacts with lighting device 110. A wireless-Ethernet bridge 130(*e*) interacts with television 104(*b*) and a DSS box 120. Wireless-Ethernet bridge 130(*e*) can support any IP addressable device. As such, television 104(*b*) and DSS box 120 are "next generation" UPnP devices that have IP addresses.

Therefore, the present invention can integrate legacy devices (e.g., consumer electronic (CE) devices that rely on infrared/serial communication protocols), as well as UPNP™ devices and applications defined by the Universal Plug and Play (UPNP) Forum, as system components. An example of a controlled environment implementing an IEEE 802.11(b) infrared/serial bridge is described in the application entitled "Legacy Device Bridge for Residential or Non-Residential Networks" (U.S. patent application Ser. No. 10/387,590; filed Mar. 14, 2003), which is incorporated herein by reference as though set forth in its entirety.

As described above, portable controller 108 (such as, a digital personal assistant, wireless notepad, etc.) enables a user to remotely alter the configuration and performance of other devices and/or applications from any location within the controlled environment. In an embodiment, portable controller 108 is a handheld platform having a graphic display that has wireless connectivity to a central server that can control the other devices and/or applications within a controlled environment via a wireless communications network 180 (e.g., as specified by IEEE standard 802.11b). In another embodiment, the server is built into portable controller 108. In another embodiment, portable controller 108 communicates directly with the other devices and/or applications via infrared (IR) code signals.

In an embodiment, the present invention facilitates control of a system comprising an output system component (e.g., a television, a monitor, a speaker, etc.) having multiple input system components (e.g., DVD, VCR, satellite tuner, digital video recorder, stereo, etc.). In accordance with the present invention, the user first selects the output component via the GUI presented on portable controller 108. The user is then presented with a control screen affording the user with the ability to select a specific input component using a "tabbed" interface. When that input is selected, the control screen for that component is presented.

Figure 2:
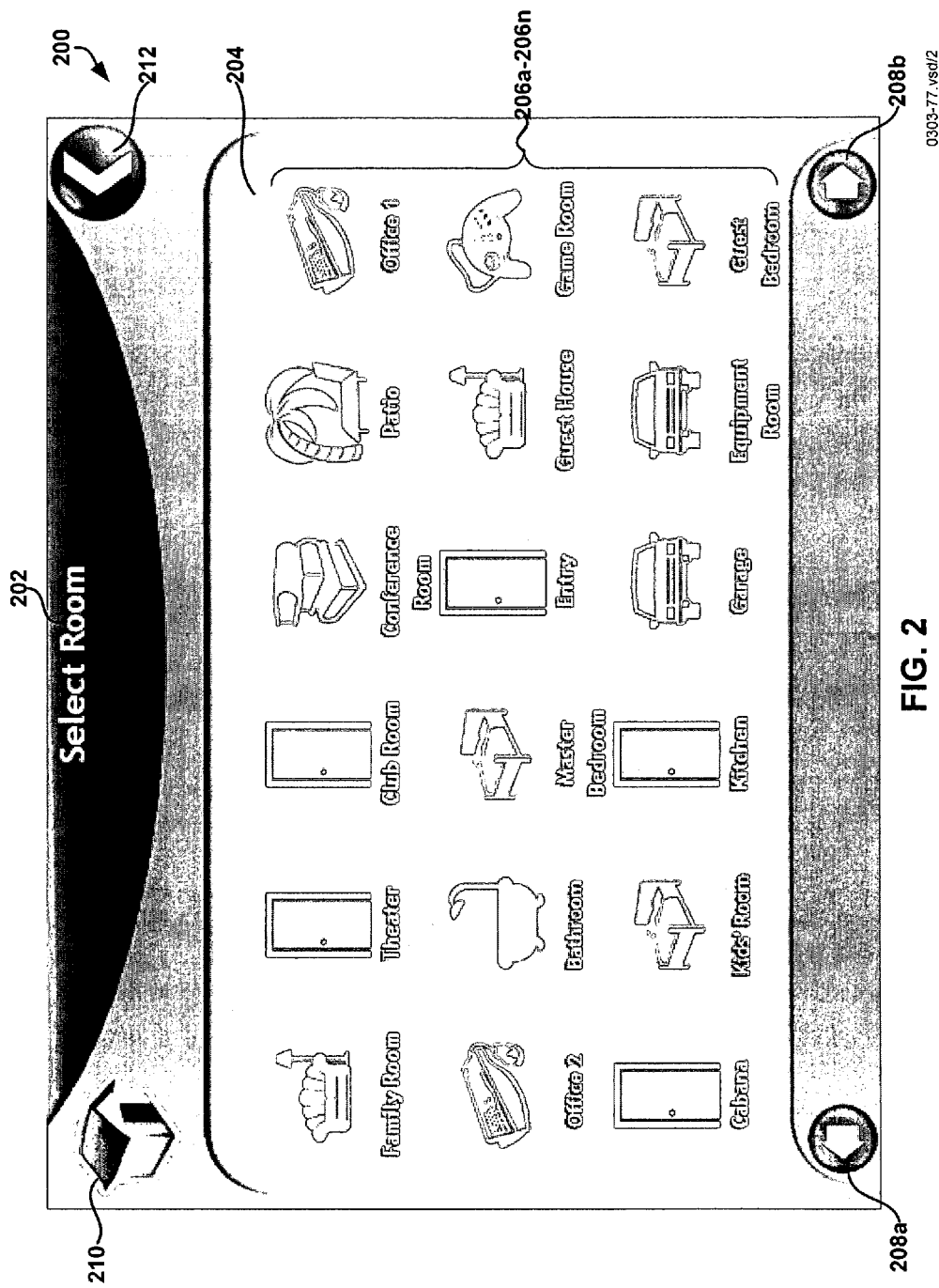
FIG. 2 illustrates a hierarchical control interface according to an embodiment of the present invention.

FIG. 2 illustrates a hierarchical control interface 200 in accordance with an embodiment of the present invention. Control interface 200 is based on a hierarchical representation of a controlled environment (e.g., a user's house) with underlying interface sublevels corresponding to rooms in the controlled environment, and then system components in each of the rooms. As suggested by the interface level identification field 202, control interface 200 enables a user to select a room to control the system components located within the room.

Control interface 200 includes several control objects, which are associated with a sequence of executable commands. The control objects include a home object 210, inter-level navigational object 212, intra-level navigational objects 208*a*-208*b*, and a plurality of room control objects 206*a*-206*n*.

Figure 6:
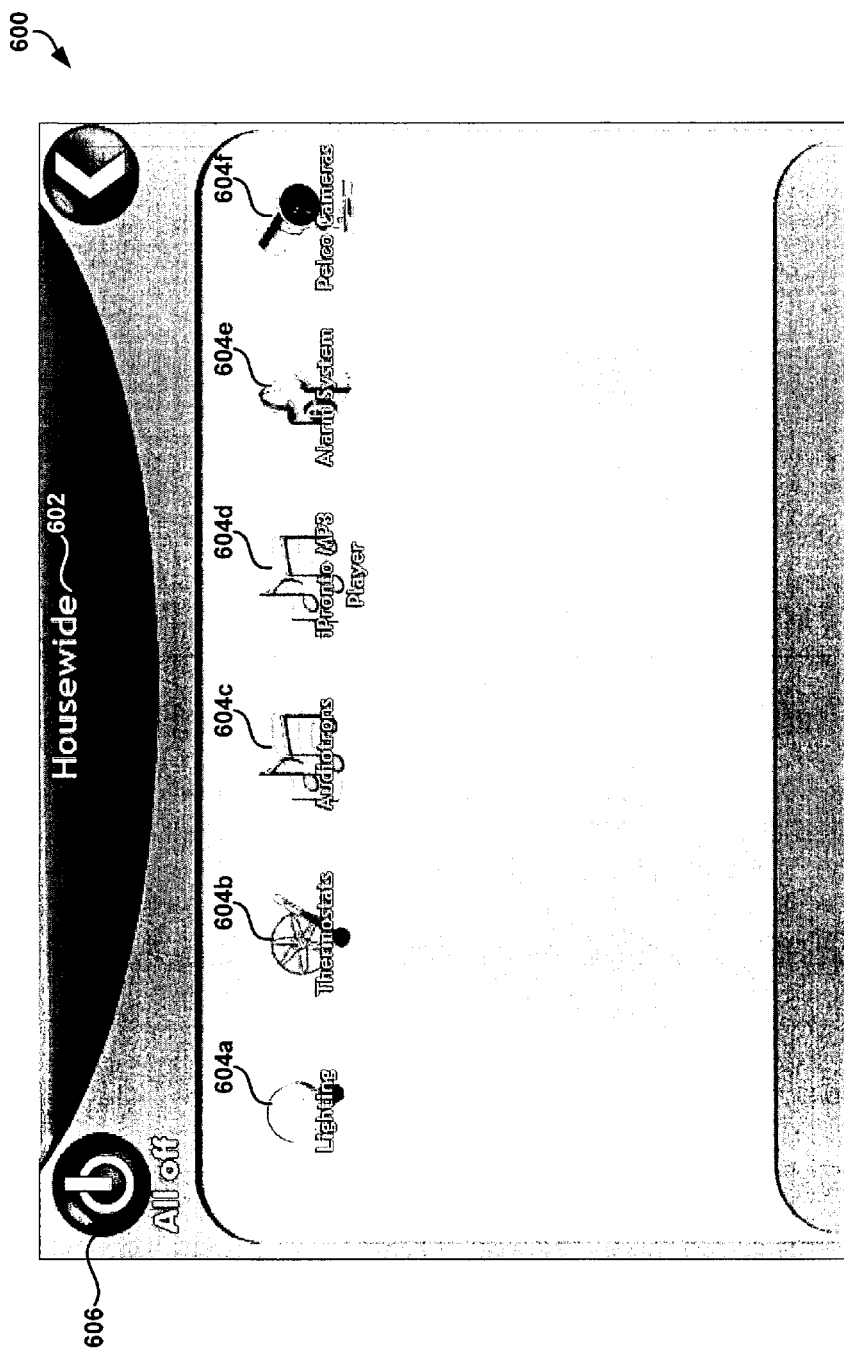
FIG. 6 illustrates a component-type hierarchical control interface according to an embodiment of the present invention.

When activated, home object 210 presents a user with a global or "housewide" control screen, such as control interface 600 that is shown and described below with reference to FIG. 6. Referring back to FIG. 2, control screen 204 is the primary control screen presented to the user, and allows the user to view a plurality of room control objects 206*a*-206*n*, which correspond to the rooms in the controlled environment. Each room control object 206*a*-206*n* corresponds to one of the rooms, and is associated with executable commands that retrieve an underlying interface sublevel to display a screen that identifies the controllable system components located within the room. By activating one of the room control objects 206a-206n, a user thereby is able to select a particular room for purposes of controlling the system components contained in that room.

Intra-level navigational objects 208a-208b are activated to horizontally scroll screen 204. If all room control objects 206a-206n are not visible in a current view, navigational objects 208a-208n scrolls screen 204 to bring the non-visible control objects 206a-206n into view.

Inter-level navigational object 212 enables the user to move from one interface sublevel to the next. For example, if the user activates a room control object 206 to access a lower level view, the user can activate inter-level navigational object 212 to return the next higher level.

Figure 3:
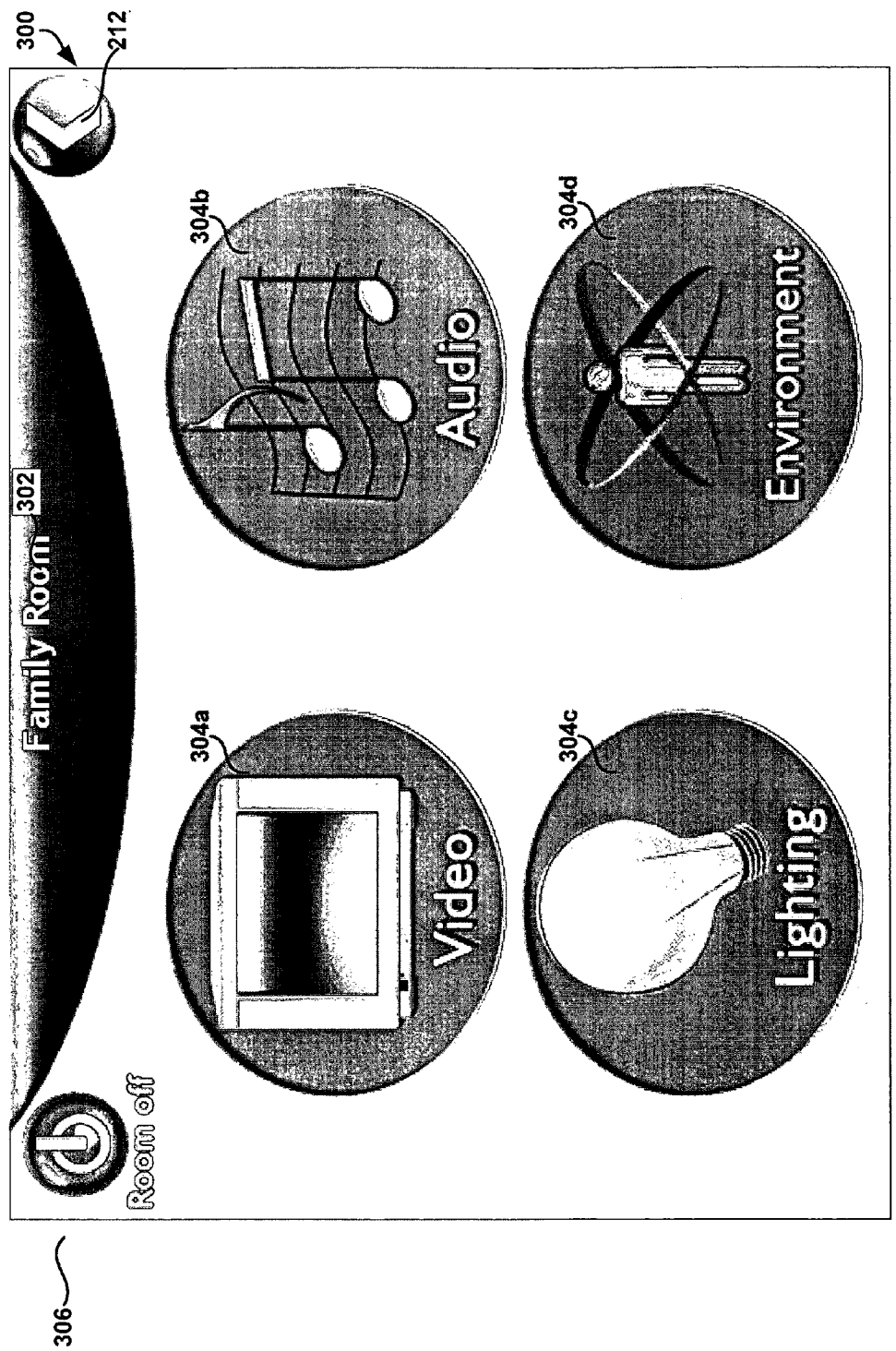
FIG. 3 illustrates a room control screen according to an embodiment of the present invention.

As discussed above, when a room control object 206a-206n is activated, a control screen for the corresponding room is presented. FIG. 3 illustrates an embodiment of a room control screen 300 that is presented by portable controller 108 upon activation of a room control object 206a-206n. Room control screen 300 provides control options for controlling a family room as shown in the interface level identification field 302.

Room control screen 300 includes a video control object 304a, an audio control object 304b, a lighting control object 304c, and an environment control object 304d. Video control object 304a is associated with executable commands for controlling a video system in the room. Audio control object 304b is associated with executable commands for controlling an audio system in the room. Lighting control object 304c is associated with executable commands for controlling room lighting. Environmental control object 304d is associated with executable commands for controlling a HVAC system in the room. Additional control objects can be included to control other types of devices and/or applications within a specific room.

As discussed above, inter-level navigational object 212 allows the user to switch to the next higher interface level. For example, the next higher level for control screen 300 is top-level control screen 200.

Switch object 306 is associated with executable commands to turn-on or turn-off all system components within the room. Therefore, all system components within the room can be turned-on or turned-off with one click, or more specifically, with the activation on one control object (i.e., switch object 306).

Figure 4:
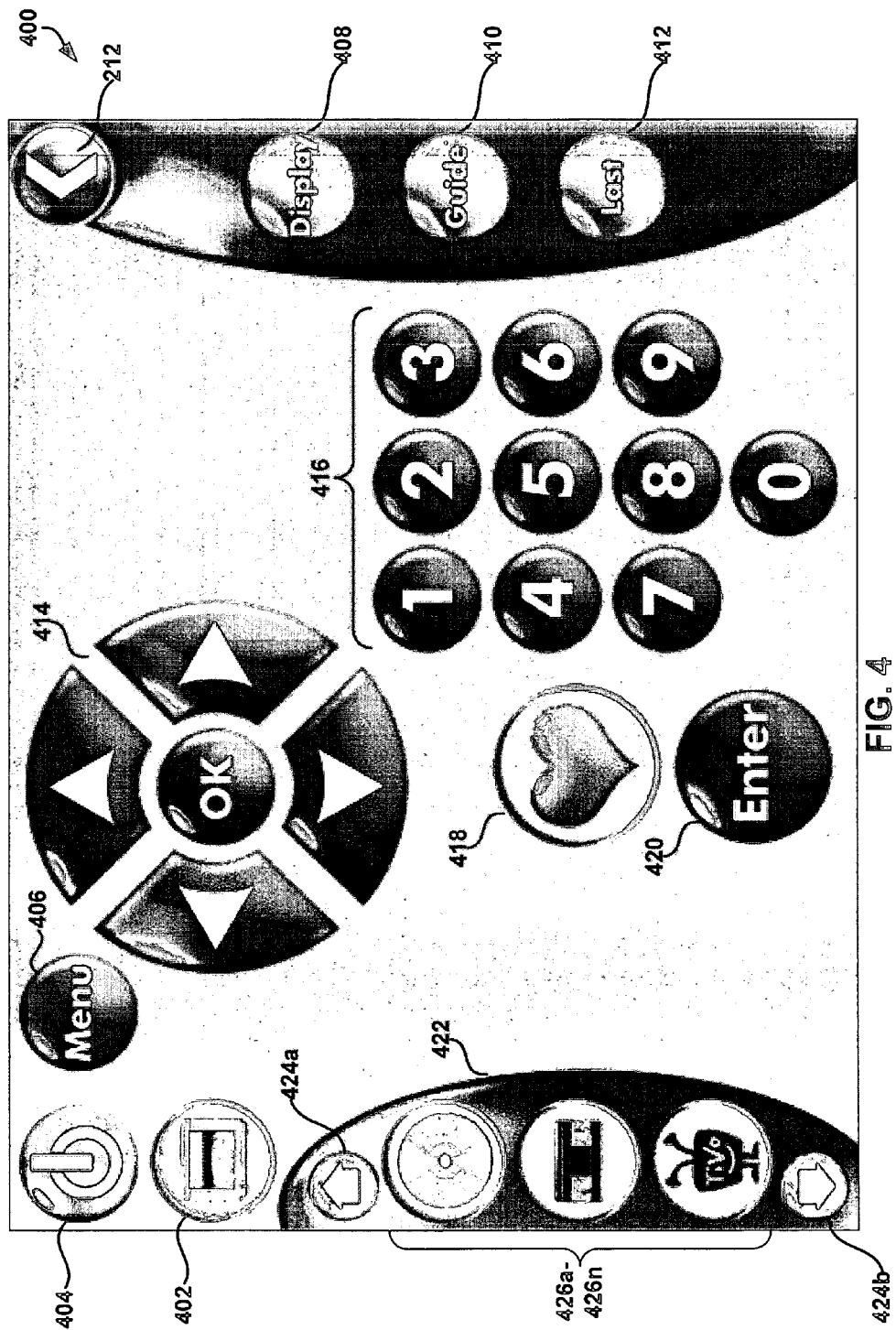
FIG. 4 illustrates a component control screen according to an embodiment of the present invention.

As discussed above, when a component control object (such as, control objects 304a-304d) is activated, a control screen for the corresponding system component is presented. FIG. 4 illustrates component control screen 400 according to an embodiment of the present invention. Specifically, component control screen 400 is presented when a user activates video control object 304a from FIG. 3. Component control screen 400 displays a control panel for controlling a television, which is a parent or primary system component for the video system in the room. Parent icon 402 is highlighted to designate the system component as being a parent system component. Parent icon 402 can be highlighted by being displayed at a brighter intensity or by a specific color, such as green. Parent icon 402 is not highlighted if the system component is a child or affiliate system component.

The control panel for component control screen 400 includes a numerical channel pad 416, a pad enter activator 420, an on-screen menu display activator 406, and an on-screen menu navigator/selector 414. Control screen 400 also includes several specialized control objects, such as a favorite channels object 418, display object 408, electronic guide object 410, and a last channel object 412.

Switch object 404 is associated with executable commands to turn-on or turn-off the television/parent system component. Inter-level navigational object 212 allows the user to switch to the next higher interface level. For example, the next higher level for component control screen 400 is room control screen 300.

Component control screen 400 also includes a side tab 422 in the form of a scrollable field that graphically shows the children system components that are connected to the parent system component. The children system components are represented by children component control objects 426a-426n. FIG. 4 shows three children component control objects, namely a DVD control object 426a for controlling a DVD player, a VHS control object 426b for controlling a VHS player, and a PVR control object 426c for controlling a PVR player, such as a TIVO® digital video recorder (DVR) available from TiVo Inc. (USA). Other children component control objects 426a-426n can be revealed by scrolling up or down side tab 422 by activating up navigational object 424a and down navigational object 424b.

In an embodiment, component control screen 400 is customized as appropriate for portable controller 108. For example, the screen shown in FIG. 4 can be used with a Philips IPRONTO® device available from Philips Consumer Electronics, which has hard buttons (not shown) for certain basic functions such as volume. As such, the control screens of the present invention can include a combination of soft keys and hard keys for designated functions, such as volume.

Figure 5:
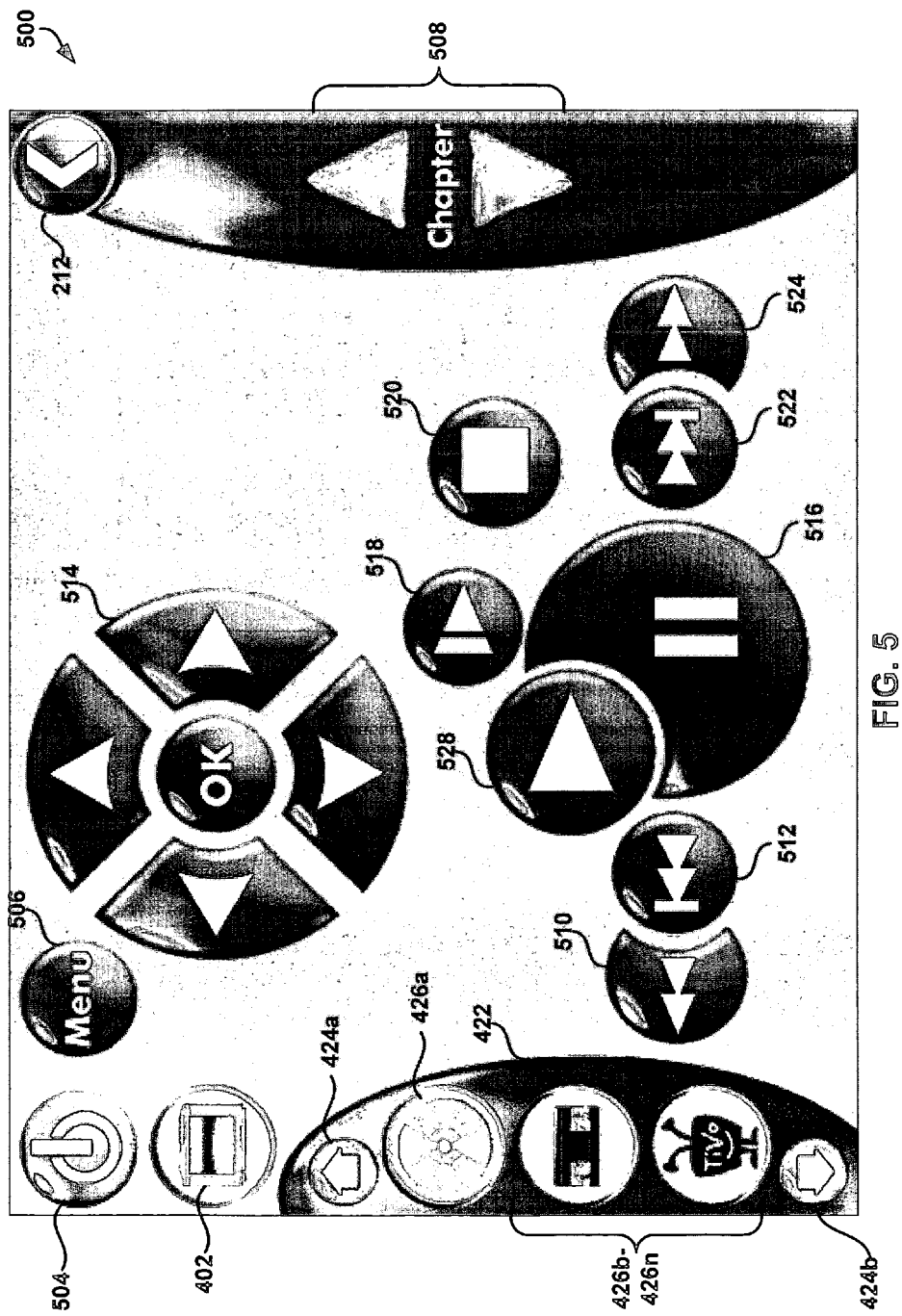
FIG. 5 illustrates a component control screen according to another embodiment of the present invention.

As discussed above, when a child component control object 426a-426n is activated, a control screen for the corresponding system component is presented. FIG. 5 illustrates a component control screen 500 that is produced from the activation of a child component control object 426a-426n according to an embodiment of the present invention. Component control screen 500 displays the control options for a DVD player. For example, if a user desires to watch a movie playing on the DVD player, the user can activate DVD player object 426a, whereupon DVD component control screen 500 is displayed. DVD control object 426a is highlighted to inform the user that the control screen for the DVD player has been selected. The other children component control objects 426b-426n are not highlighted.

DVD component control screen 500 displays the options for controlling the functions of the DVD player. The options include a rewind object 510, a skip back object 512, a skip-forward object 522, a fast-forward object 524, a play object 528, a slow play object 518, a pause object 516, and a stop object 520. Chapter navigator 508 allows the user to select specific chapters in the digital recording. DVD component control screen 500 also includes an on-screen menu display activator 506 and an on-screen menu navigator/selector 514.

Parent icon 402 is not highlighted on control screen 500 because the system component that is controlled by control screen 500 is a child system component. Switch object 504 is associated with executable commands to turn-on or turn-off the DVD player. Inter-level navigational object 212 allows the user to switch to the next higher interface level. For example, the next higher level for child-component control screen 500 is parent-component control screen 400.

As described above, the user interface for portable controller 108 can be organized in a hierarchical layout. However, the layout is not restricted to a house-room hierarchy. In an embodiment, the user interface organizes the system components by component type for ease of control. FIG. 6 illustrates an embodiment of a control interface 600 that is based on a component-type control hierarchy. Control interface 600 provides options for aggregating the control of all system components matching a specific component type as shown in the interface level identification field 602. The underlying interface sublevels correspond to the types of system components that are located throughout the controlled environment. Control interface 600 includes six component-type control objects 604a-604f, which represent six types of system components within the controlled environment. Specifically, all available lighting systems are linked and grouped to lighting component-type control object 604a. All environmental/comfort systems are linked and grouped to environmental component-type control object 640b. The available audio components are grouped and linked to an audio component-type control objects 604c-604d. The alarm components for the safety/security systems are linked and grouped to safety/security component-type control object 604e. Finally, the video components for the safety/security systems are grouped and linked to safety/security component-type control object 604f.

Switch object 606 is associated with executable commands to turn-on or turn-off all system components matching a specific component type. For example, if lighting component-type control object 604a is selected, switch object 606 can be activated to turn-on or turn-off lighting systems that are linked to control object 604a. Control object 604a can be "selected" by using a mouse or similar input component to place a cursor over control object 604a and right-click, or left-click, the mouse once. A double left-click can be used to "activate" control object 604a. If using a touch screen, a single tap can be used to select a control object and a double tap can be used to activate the object. Pull-down menus can also be used to distinguish between the "selection" and "activation" of a control object.

Figure 7:
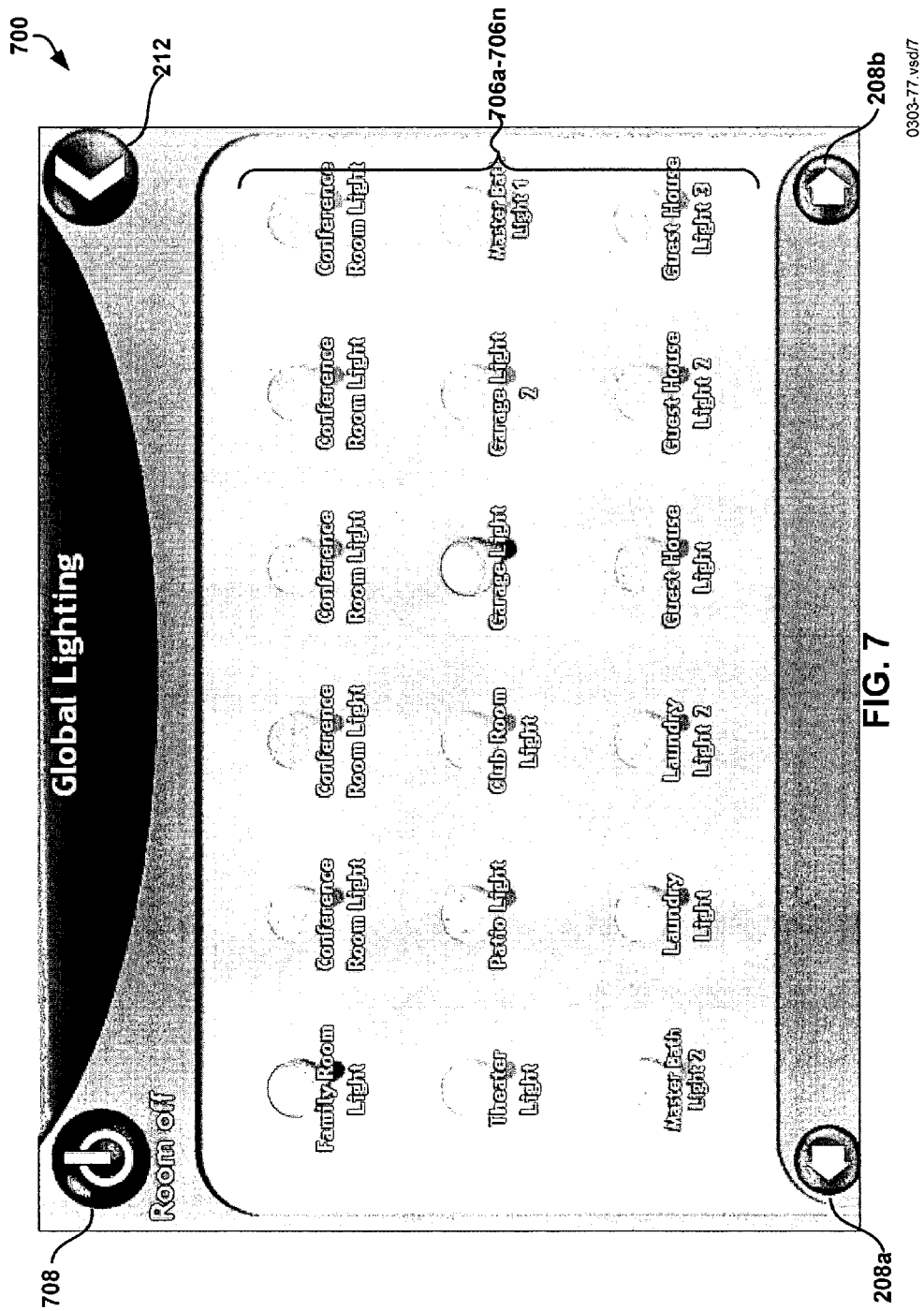
FIG. 7 illustrates a lighting control screen according to an embodiment of the present invention.

Activation of a component-type control object 604a-604f sends commands to present the next underlying interface sublevel, which identifies all available system components matching the corresponding component type. FIG. 7 illustrates an embodiment of a lighting control screen 700 that displays all controllable lighting in the controlled environment house. A plurality of lighting control objects 706a-706n are associated with the lighting systems in each room of the controlled environment. If more than one lighting system (e.g., lamp, over-head lighting, etc.) is located in a room, the activation of a lighting control object 706a-706n calls a sublevel screen that displays the various lighting systems within the corresponding room. In an embodiment, the activation of a lighting object 706a-706n (by, for example, double-clicking the object or double-tapping) calls a sublevel screen that displays the available control options for the lighting system. The control options includes dimming, timer-controls, and the like.

Switch object 708 is associated with executable commands to turn-on or turn-off a lighting system(s) associated with a lighting control object 706a-706n. In an embodiment, a user would operate an input component to select one or more lighting control objects 706a-706n and then select switch object 708 to operate the associated lighting systems. In an embodiment, a user could turn-on or turn-off all lighting in, for example, a house with switch object 708, which can operate as a housewide "all lighting off" or "all lighting on" switch.

Intra-level navigational objects 208a-208b are activated to scroll screen 704 to bring non-visible lighting control objects 706a-706n into view. Inter-level navigational object 212 allows the user to switch to a next higher interface level. For example, the next higher level for lighting control screen 700 is component-type hierarchical control interface 600.

In an embodiment, lighting control objects 706a-706n are highlighted (e.g., intensity, color, or the like) to indicate that a lighting system is on or off. As such, the control interfaces of the present invention gives a user a convenient, visible indication of which system components (e.g., lights, televisions, security cameras, oven, etc.) are on/off in the controlled environment. Moreover, the visible indication can be provided on a single screen or a single scrollable screen, depending on the quantity of control objects. This affords the user with the ability to control these components using one master screen, rather than controlling lighting on a room-by-room basis, which would require the user to navigate through several room control screens. For example, in FIG. 7, the lights in the Family Room and Garage Lights are indicated as being in the "on" state. The user can turn the lights off in those rooms by deactivating the corresponding lighting control object 706a-706n or turn the lights on in any other room of the house by activating the lighting control object 706a-706n corresponding to the room.

Figure 8:
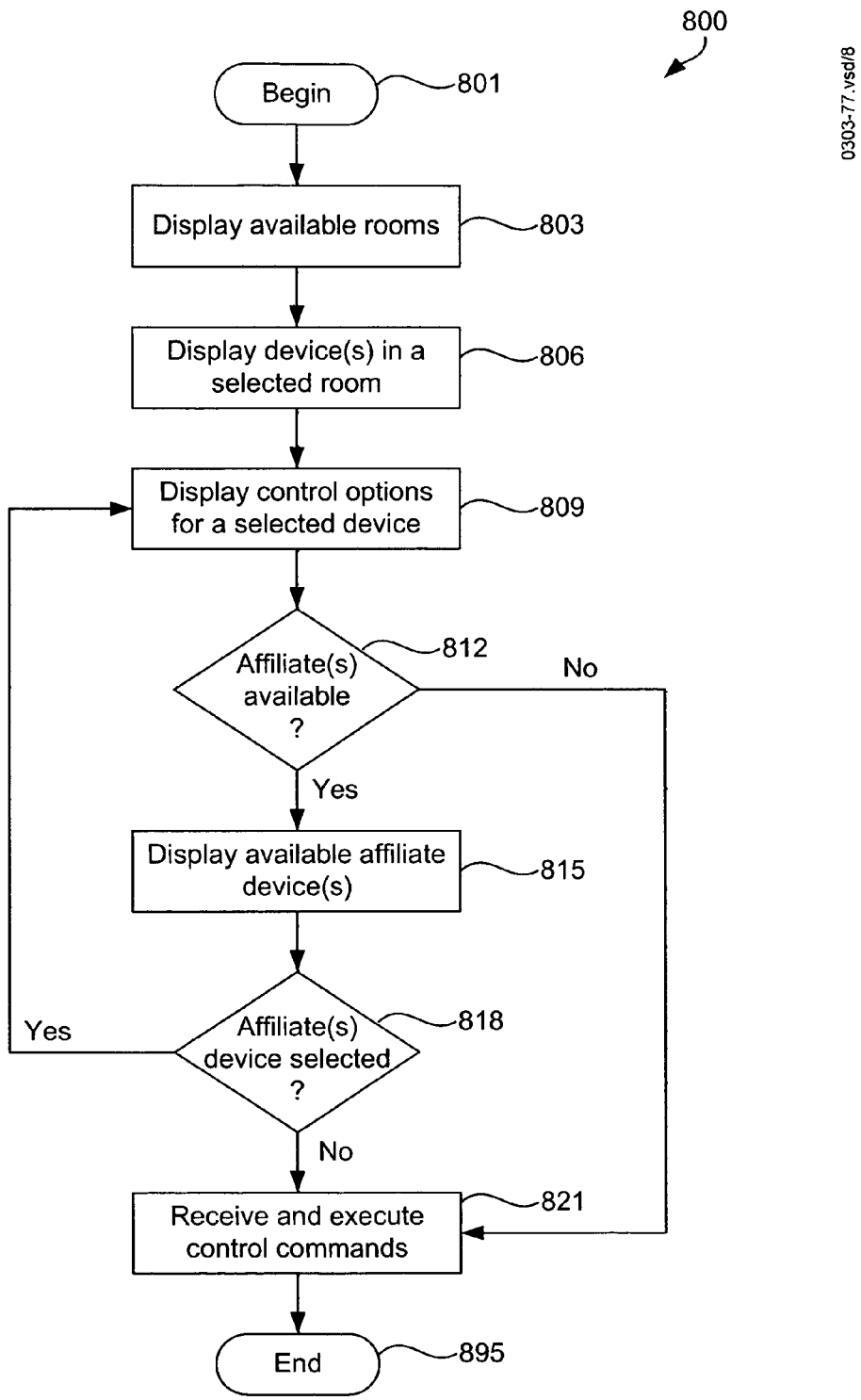
FIG. 8 illustrates a flow diagram for displaying control interfaces based on a room hierarchy according to an embodiment of the present invention.

The present invention supports various protocols for displaying hierarchical control interfaces for controlling a plurality of system components within a controlled environment. Referring to FIG. 8, flowchart 800 represents the general operational flow of an embodiment for displaying control interfaces. More specifically, flowchart 800 shows an example of a control flow for presenting a hierarchical control interface based on a room hierarchy.

Referring to FIG. 8, the control flow of flowchart 800 begins at step 801 and passes immediately to step 803. At step 803, a control screen is accessed and presented for display. The control screen displays all available rooms within a controlled environment. An example of a room-based hierarchical control screen is described above with reference to control screen 200 in FIG. 2. Control screen 200 displays the available rooms as control objects 20a-20n. However, the available rooms can also be presented as a hypertext-based list. Each room specified in the list or associated with a control object 20a-20n is linked to an underlying screen, which identifies the controllable system components within the room.

At step 806, a room control screen is accessed and presented to display the one or more system components that are located within a selected room. The room control screen is accessed in response to the activation of a corresponding control object 20a-20n or the like, as discussed at step 803. An example of a room control screen is described above with reference to room control screen 300 in FIG. 3. A room control screen displays all available system components as component control objects 30a-30d or in a hypertext-based list, both of which are linked to an underlying screen. The underlying screen identifies the control options for the associated system component.

At step 809, a component control screen is accessed and presented to display the control options for an associated system component. As discussed, the component control screen is accessed in response to the activation of a corresponding component control object 30a-30d or the like. The component control screen enables a user to select various control options to manage the operations and/or functions of a system component. Examples of a component control screen are described above with reference to component control screens 400 and 500 in FIG. 4 and FIG. 5.

At step 812, the system component associated with the component control screen is checked to determine whether it is a parent system component. If it is, control passes to step 815. Otherwise, control passes to step 821.

At step 815, all affiliate or children system components are displayed on the same component control screen to provide the user with an opportunity to control additional system components. For example, if the system component selected and controlled at step 809 is a parent system component (e.g., television), the user is able to control and/or setup an affiliate system component (e.g., DVD player) at step 812.

At step 818, if an affiliate system component is available and desired to be controlled, the control flow returns to step 809, where a component control screen for a selected affiliate system component is presented for display. The child component control screen is accessed in response to the activation of a corresponding affiliate component control object 426a-426n or the like. The operations and/or functions of the affiliate system component is managed via this control screen. As described above with reference to FIG. 4 and FIG. 5, component control screen 500 represents a control interface for controlling an affiliate system component of the parent system component controlled by component control screen 400.

If, on the other hand, no affiliate system component has been selected for controlling, the control flow passes to step 821.

At step 821, the specified control options are executed to control the associated system component(s). For example, if a parent and child system component has been programmed to play a DVD recording, the associated commands are executed to transmit control signals to the respective system components, e.g. television/parent and DVD player/child. After the control interfaces have been setup and executed, the control flow ends as indicated at step 895.

Figure 9:
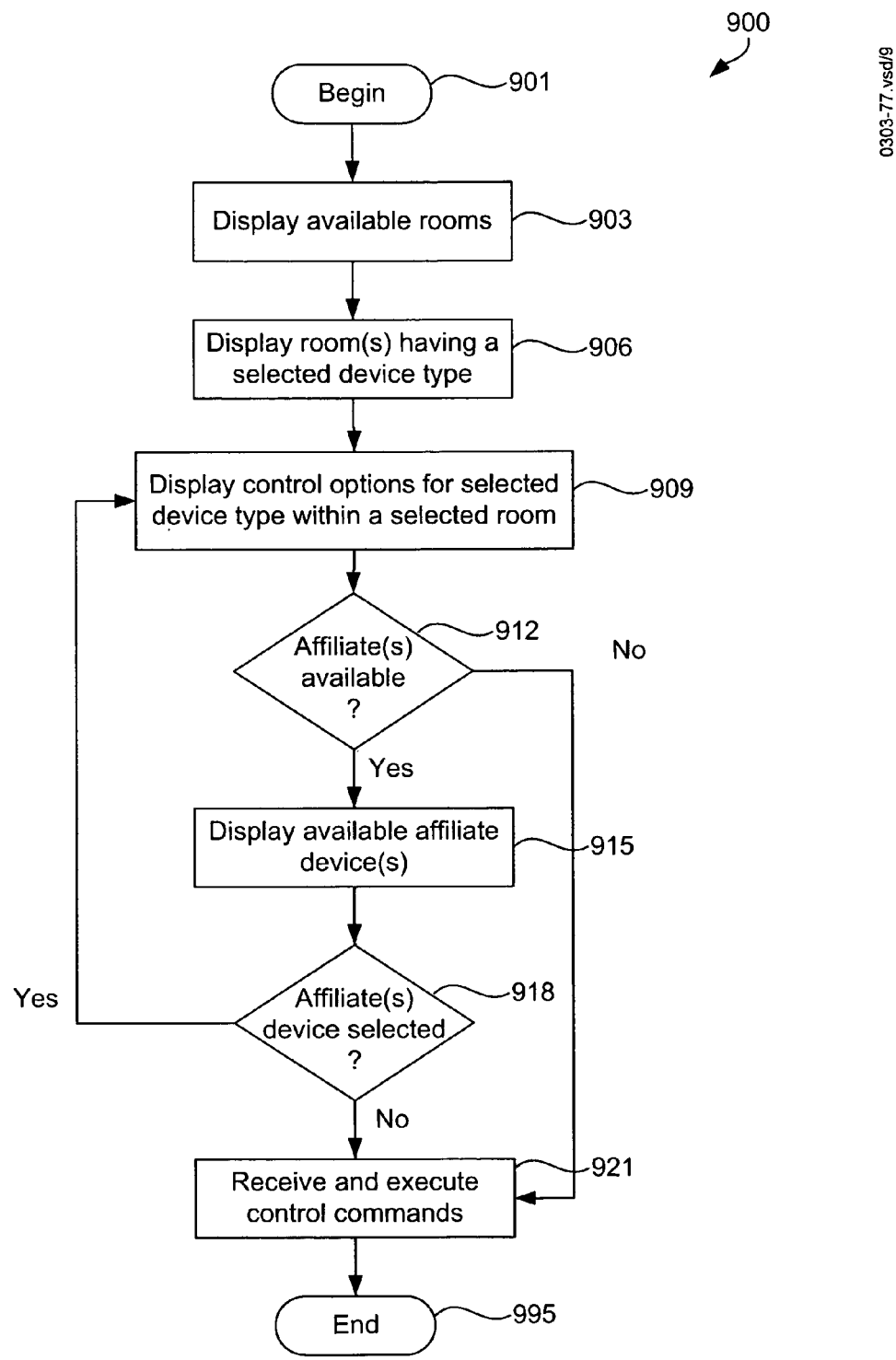
FIG. 9 illustrates a flow diagram for displaying control interfaces based on a component-type hierarchy according to an embodiment of the present invention.

Referring to FIG. 9, flowchart 900 represents the general operational flow of another embodiment for displaying control interfaces. More specifically, flowchart 900 shows an example of a control flow for presenting a hierarchical control interface based on a component-type control hierarchy.

Referring to FIG. 9, the control flow of flowchart 900 begins at step 901 and passes immediately to step 903. At step 903, a control screen is accessed and presented for display. The control screen displays all available component-types that are available within a controlled environment. An example of a component-type-based hierarchical control screen is described above with reference to control interface 600 in FIG. 6. Control interface 600 displays the available component types as control objects 604a-604f. However, the available component-types can also be presented as a hypertext-based list. Each component type (specified in a list, control object, or the like) is linked to an underlying screen, which identifies the controllable system components associated with a respective component type.

At step 906, a component-type control screen is accessed and presented to display the one or more system components matching a selected component type by location (e.g., room). The component-type control screen is accessed in response to the activation of a corresponding control object 604a-604f or the like, as discussed at step 903. An example of a component-type control screen is described above with reference to component-type control screen 700 in FIG. 7. A component-type control screen displays all available system components as component control objects 706a-706n or in a hypertext-based list, both of which are linked to an underlying screen. The underlying screen identifies the control options for the associated system component.

At step 909, a component control screen is accessed and presented to display the control options for an associated system component. As discussed, the component control screen is accessed in response to the activation of a corresponding component control object 706a-706n or the like.

The component control screen enables a user to select various control options to manage the operations and/or functions of a system component. Examples of a component control screen are described above with reference to component control screens 400 and 500 in FIG. 4 and FIG. 5.

At step 912, the system component associated with the component control screen is checked to determine whether it is a parent system component. If it is, control passes to step 915. Otherwise, control passes to step 921.

At step 915, all affiliate system components are displayed on the same component control screen to provide the user with an opportunity to control additional system components. For example, if the system component selected and controlled at step 909 is a parent system component (e.g., television), the user is able to control and/or setup an affiliate or child system component (e.g., DVD player) at step 912.

At step 918, if an affiliate system component is available and desired to be controlled, the control flow returns to step 909, where a component control screen for a selected child or affiliate system component is presented for display. The child component control screen is accessed in response to the activation of a corresponding child component control object 426a-426n or the like. The operations and/or functions of the child system component is managed via this control screen. As described above with reference to FIG. 4 and FIG. 5, component control screen 500 represents a control interface for controlling an affiliate system component of the parent system component controlled by component control screen 400.

If, on the other hand, no affiliate system component has been selected for controlling, the control flow passes to step 921.

At step 921, the specified control options are executed to control the associated system component(s). For example, if a parent and child system component has been programmed to play a DVD recording, the associated commands are executed to transmit control signals the respective system components, e.g. television/parent and DVD player/child. After the control interfaces have been setup and executed, the control flow ends as indicated at step 995.

Figure 10:
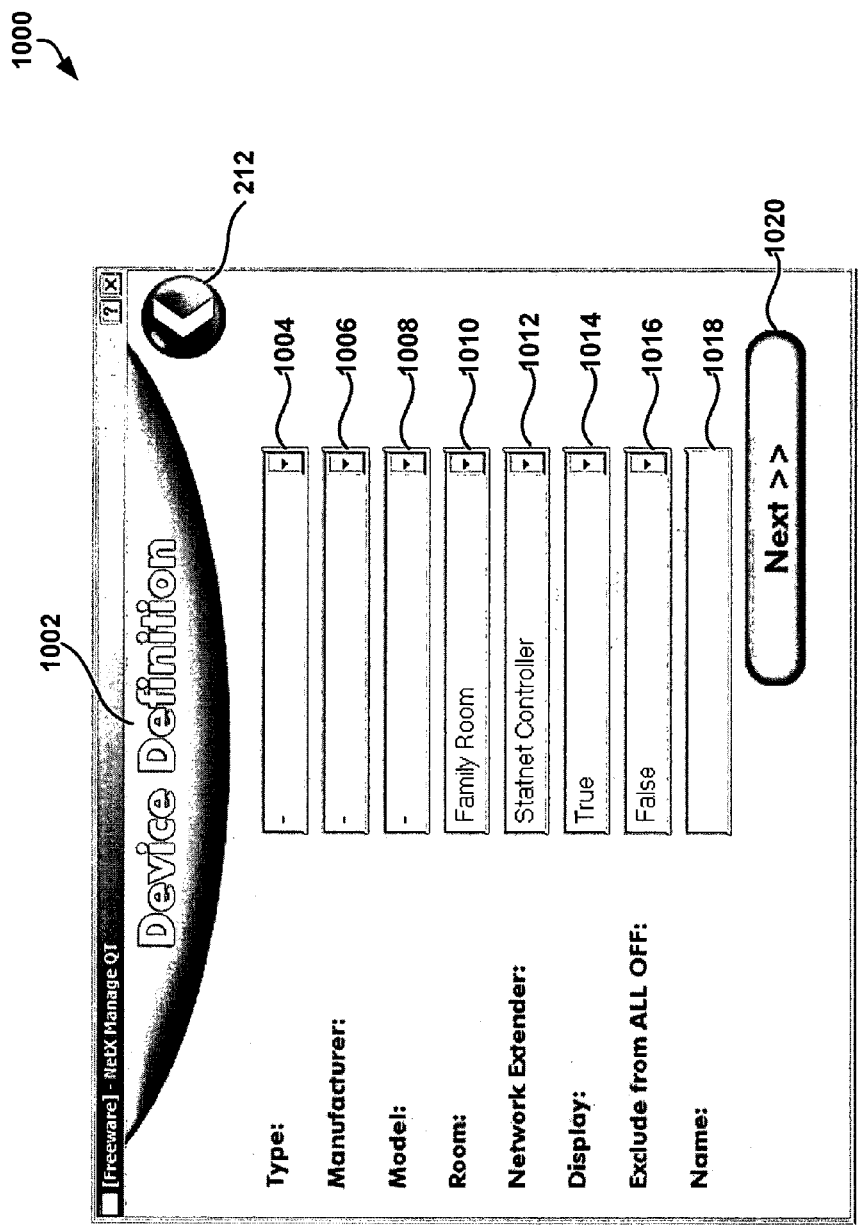
FIG. 10 illustrates a definition control screen according to an embodiment of the present invention.

The present invention includes various control screens that enable a user to add and/or configure a system component for the controlled environment. In an embodiment, a set-up wizard is provided to allow a user to add or configure system components. FIG. 10 illustrates a definition control screen 1000 in accordance with an embodiment of the present invention. Definition control screen 1000 can be included as part of a set-up wizard for adding and/or configuring a system component, as indicated in definition field 1002. Control screen 1000 includes a plurality of control fields that are populated by a user. As shown, the control fields include a type field 1004, a manufacturer field 1006, a model field 1008, a room field 1010, a network extender field 1012, a display field 1014, an exclusion field 1016, and a name field 1018.

Figure 11:
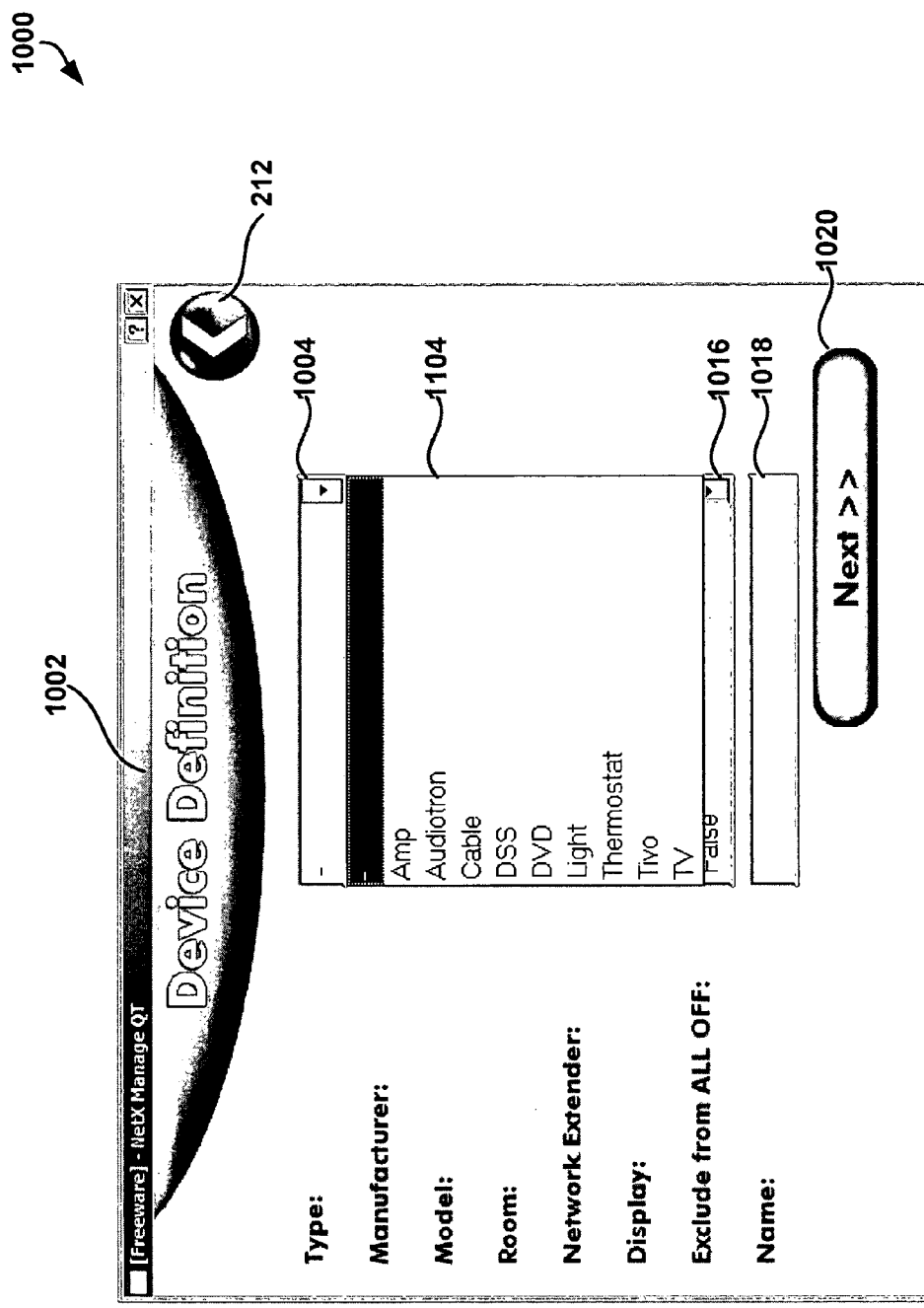
FIG. 11 illustrates a definition control screen according to another embodiment of the present invention.

Type field 1004 specifies the component type. As discussed above, a component-type hierarchical control display, such as control interface 600 and control screen 700, organizes the system components within a controlled environment by component type, and thereby, allow user to control all system components matching a specific component type from the same screen. Type field 1004 enables a user to specify the component type that supports the above-described hierarchical control user interfaces that are based on component type. An exemplary list of component types is shown in FIG. 11, which illustrates another embodiment of control screen 1000. In FIG. 11, type field 1004 shows that the component type can be an amplifier, an audiotron, a cable box, a DSS box, a DVD player, a lighting system, a thermostat, a PVR device, or a television. The list in type field 1004 is not exhaustive. Other system component types can be specified and included in the present invention, including but not limited to, a video server, messaging system, security or perimeter cameras, residential appliances, and the like.

Referring back to FIG. 10, manufacture field 1006 enables a user to specify a manufacturer of the system component, and model field 1008 enables a user to specify a model number for the system component. In an embodiment, one or more software modules are associated with the control interfaces of the present invention, and query a lookup table, database, or the like for IR codes that are transmitted to control a system component. The information specified in manufacture field 1006 and model field 1008 is used by the software module(s) to query the database or the like.

Room field 1010 specifies the room or region of the controlled environment, where the system component is located. The information in room field 1010 is used to support the room-based hierarchical control displays of the present invention (e.g., control interface 200 and control screen 300). Although this information can be initially specified by the user via a set-up wizard, the content of room field 1010 can also be initially set or dynamically updated by positioning unit 102. Examples of dynamically tracking the location of system components within a controlled environment is described in greater detail in the application entitled "Method, System, and Computer Program Product for Managing Controlled Residential or Non-Residential Environments" (U.S. patent application Ser. No. 10/382,897), and the application entitled "Method, System, and Computer Program Produce for Managing Controlled Residential or Non-Residential Environments," (U.S. patent application Ser. No. 10/180,500).

A Name field 1018 is included to allow a user to customize the name for the system component. The user can specify a personalized descriptor for easy recall.

Definition control screen 1000 also includes a network extender field 1012, which allows a user to associate the system component with an appropriate bridge. As described above with reference to FIG. 1, an infrared/serial bridge 130 can be coupled to a system component to support wireless communications with other system components. As discussed, system 100 can have a plurality of infrared/serial bridges 130(*a*)-130(*e*) (e.g., one per stack or one per room).

Display field 1014 allows a user to incorporate and/or configure one or more "hidden" affiliate system components that are linked to a parent system component. Hidden system components (such as, amplifiers) are configured into system 100, but the control screens (e.g., control screen 400) of the present invention can be configured to not present hidden affiliate system components to the user, because hidden affiliate system components operate invisibly to the user. Nonetheless, hidden affiliate system components are linked to one or more other parent system components. For example, an amplifier can be linked to a television, DVD player, and CD player. The amplifier would be automatically activated when either of these parent system components is selected through screen 1000. Volume controls, for example, that are established for these parent system components would be automatically redirected to the hidden amplifier. Accordingly, display field 1014 gives the user the ability to choose whether to see an affiliate system component on the component control screen (e.g., side tab 422 on control screen 400). In an embodiment, affiliate system components are displayed if the value of display field 1014 is "True," and affiliate system components remain hidden from display if the value of display field 1014 is "False."

Definition control screen 1000 also includes an exclusion field 1016, which allows a user to exempt a particular system component from an "ALL OFF" or "ALL ON" (Room or Home) command. As discussed above, switch objects 306, 606, and 708, for example, are associated with global commands that can be executed to turn-off or turn-on all system components (or all system components matching a specified component type) within a specific region, or within an entire controlled environment (e.g., system 100). However, exclusion field 1016 allows a user to exempt a particular system component, a particular type of system component, or system component(s) within a designated region, from these global commands. For example, the user can exclude a television in the living room from being turned-off when switch object 306 is activated.

Control screen 1000 overlays the concept of device chains. When system components are configured in accordance with the present invention, a chain of related or affiliate system components (system components with input/output dependencies) is established. For example, one such chain can be a DVD player, amplifier, and television. Another chain can be a CD player and amplifier. A third chain can be a television and tuner. The present invention includes methodologies and/or techniques for turning-on or turning-off all system components in a chain (e.g., the amplifier turns-on when a CD player is initiated) and proxying control to the appropriate affiliate system components (e.g., volume requests go to the amplifier; or chapter selections go to the DVD player).

Control screen 1000 also includes next object 1020, which calls the next control screen in the set-up wizard. Inter-level navigational object 212 recalls the previous screen within the set-up wizard.

The control interfaces of the present invention provide a convenient and efficient manner for controlling a parent system component and its affiliate (including hidden) system components from a common platform. Referring back to FIG. 4, side tab 422 is a scrollable field that graphically shows the children control objects 426*a*-426*n*, which are associated with children system components. As described, the children system components are affiliated with the parent system component controlled by component control screen 400. In an embodiment, each individual child system component that comprises side tab 422 is configured by the user using a set-up wizard. The set-up wizard allows the user to specify the system components that are connected to a television/parent system component, and relay this information to the software modules supporting the control interfaces of the present invention.

Figure 12:
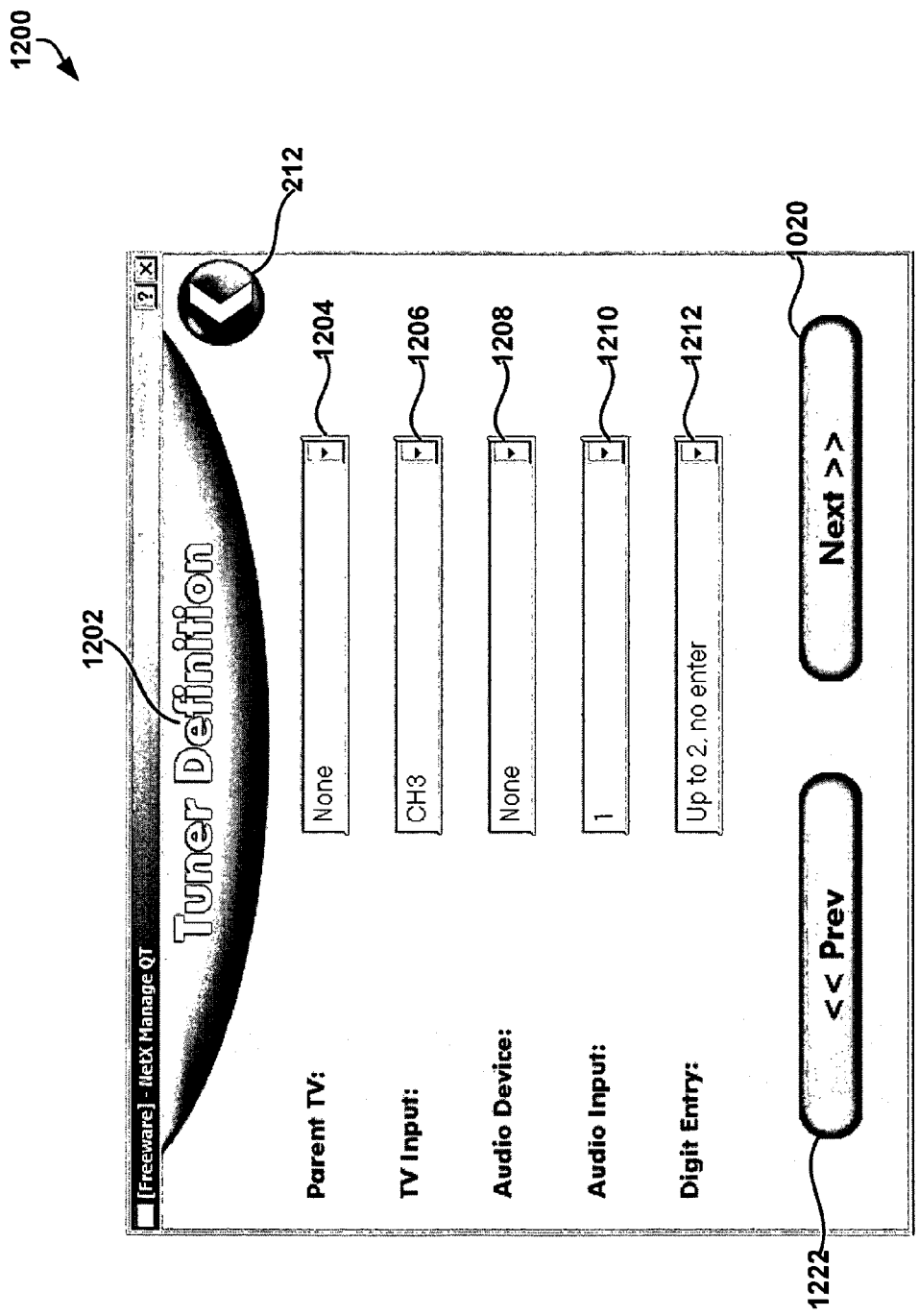
FIG. 12 illustrates a tuner definition control screen according to an embodiment of the present invention.

FIG. 12 illustrates a definition control screen 1200 that allows a user to specify affiliate system components to a parent system component, according to an embodiment of the present invention. Definition control screen 1200 enables specifications to be established for a tuner device as indicated in definition field 1202. Definition control screen 1200 includes a parent field 1204, input field 1206, audio device field 1208, audio input field 1210, and a digit entry field 1212.

Parent field 1204 specifies whether the tuner device is a parent or child system component. If the system component is a parent system component, parent field 1204 contains the input "none." If the system component is a child system component, parent field 1204 lists the name of the parent system component.

Input field 1206 specifies the channel input. The channel input is used to tune the system component to receive and decode a video signal from the associated frequency channel.

Audio field 1208 identifies whether an audio output system component is affiliated with the tuner device. For example, if the user intends for audio output to be feed to an auxiliary speaker system or audio amplifier, the system component name for the speaker system is entered in audio field 1208. In such case, the speaker system would be the child system component to the tuner/parent system component.

Audio input field 1210 identifies the appropriate input channel on the speaker system that is specified in audio field 1208.

Digit entry field 1212 specifies the quantity of digits that are needed to change channels on the tuner. For example, some tuners only accept two digits (i.e., limited to channels 01 to 99). Other tuners can accept up to four digits. The quantity of channel digits depends on the make and model of the system component (e.g., tuner) that is being configured. Therefore, digit entry field 1212 identifies metadata that describes the unique control behaviors of a system component. In an embodiment, portable controller 108 is programmable to extract this channel-digit metadata for the tuner from a metadata database. Examples of a system and method for extracting channel-digit metadata from a metadata database are described in the application entitled "Device Control Database," (U.S. patent application Ser. No. 10/783,017, which is incorporated herein by reference as though set forth in its entirety. However, if the metadata database does not contain such information, the channel-digit metadata is read from digit entry field 1212. Alternatively, digit entry field 1212 can be used to override the data stored in the metadata database.

Next object 1020 calls the next control screen in the set-up wizard. Previous object 1222 calls the previous control screen. Inter-level navigational object 212 allows the user to switch to the next higher interface level with the set-up wizard. For example, if the user has configured a parent system component at one level, and is currently configuring an affiliate system component at a second, lower level, the user can return to the first level for the parent system component by activating navigational object 212, or the user can return to a previous screen for defining the affiliate system component at the second level by activating previous object 1222.

Figure 13:
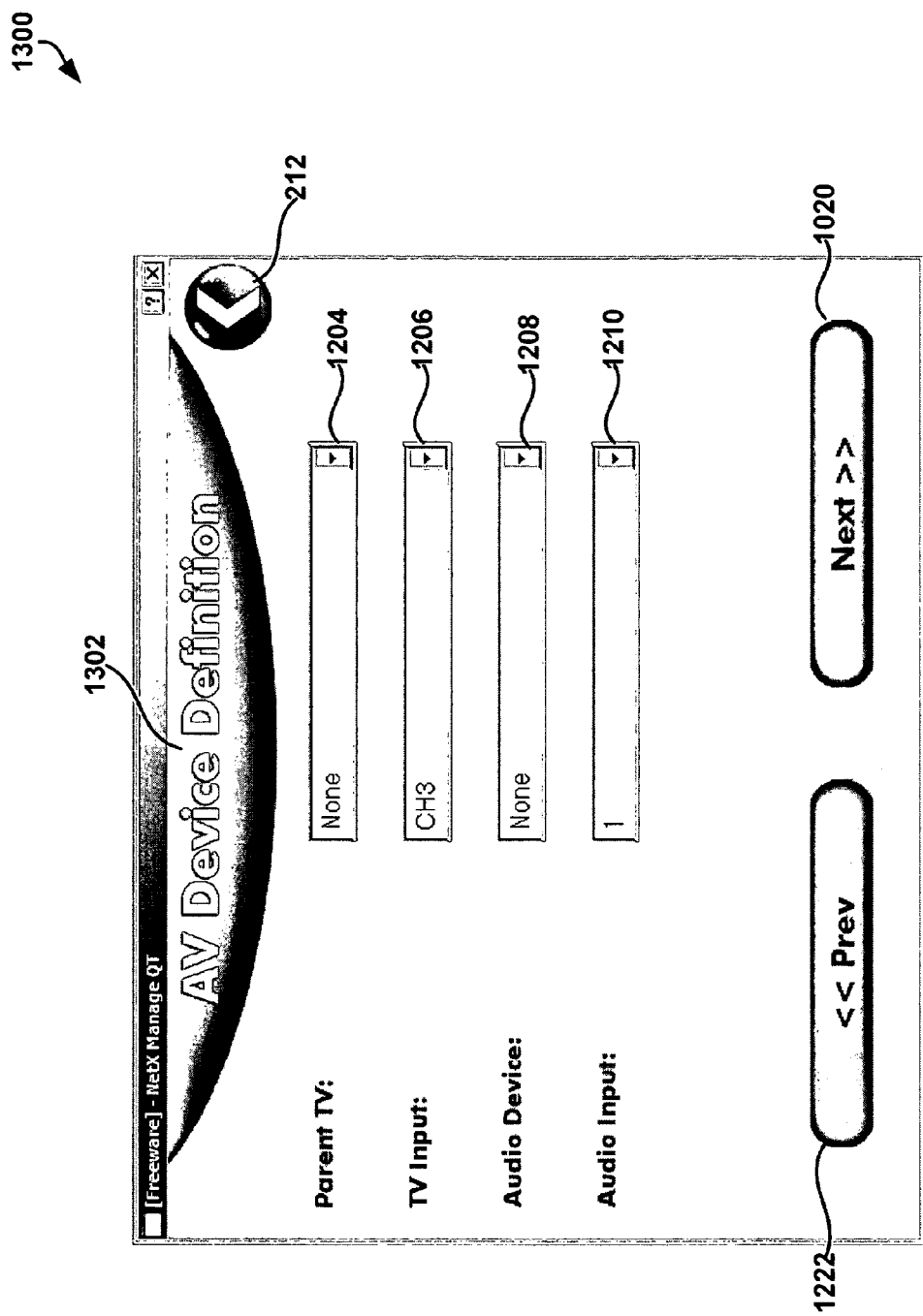
FIG. 13 illustrates an audio-video component definition control screen according to an embodiment of the present invention.

FIG. 13 illustrates another embodiment of a definition control screen 1300 that allows a user to link affiliate system components to a parent system component. Definition control screen 1300 enables specifications to be established for an audio-video system component as indicated in definition field 1302. Control screen 1300 can be used to affiliate the audio-video system component to the tuner that is configured in control screen 1200. As such, control screen 1300 would represent a sub-layer level of control screen 1200. Thus, activation of inter-level navigational object 212 would call the next higher interface level, namely screen 1300. However, activation of previous object 1222 call a previous control screen in a series of control screens for configuring the audio-visual system component.

FIGS. 1-13 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 14:
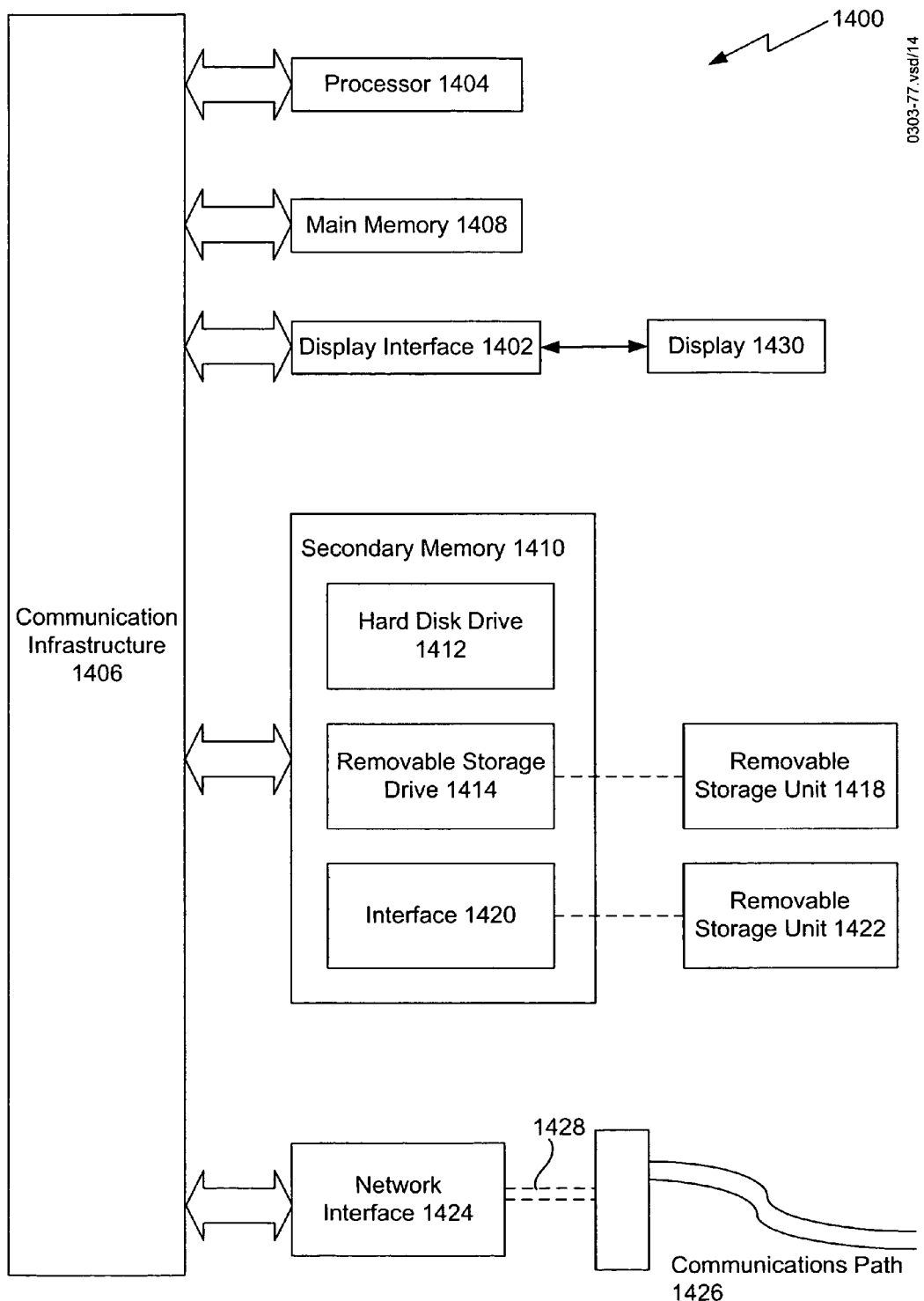
FIG. 14 is an example computer system useful for implementing the present invention.

Additionally, the present invention can be implemented in one or more computer systems or other processing systems, capable of carrying out the functionality described herein. Referring to FIG. 14, an example computer system 1400 useful in implementing the present invention is shown. Various embodiments are described in terms of this exemplary computer system 1400. After reading this description, it will become apparent to a person skilled in the relevant art(s) how to implement the invention using other computer systems and/or computer architectures.

The computer system 1400 includes one or more processors, such as processor 1404. Processor 1404 can be a special purpose or a general purpose digital signal processor. The processor 1404 is connected to a communication infrastructure 1406 (e.g., a communications bus, cross-over bar, or network).

Computer system 1400 can include a display interface 1402 that forwards graphics, text, and other data from the communication infrastructure 1406 (or from a frame buffer not shown) for display on the display unit 1430.

Computer system 1400 also includes a main memory 1408, preferably random access memory (RAM), and can also include a secondary memory 1410. The secondary memory 1410 can include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well-known manner. Removable storage unit 1418, represents a floppy disk, magnetic tape, optical disk, etc. which is read by and written to removable storage drive 1414. As will be appreciated, the removable storage unit 1418 includes a computer usable storage medium having stored therein computer software (e.g., programs or other instructions) and/or data.

In alternative embodiments, secondary memory 1410 includes other similar means for allowing software and/or data to be loaded into computer system 1400. Such means include, for example, a removable storage unit 1422 and an interface 1420. Examples of such means include a program cartridge and cartridge interface (such as that found in video game devices), a removable memory chip (such as, an EPROM or PROM) and associated socket, and other removable storage units 1422 and interfaces 1420 which allow software and data to be transferred from the removable storage unit 1422 to computer system 1400.

Computer system 1400 can also include a communications interface 1424. Communications interface 1424 allows software and/or data to be transferred between computer system 1400 and external devices. Examples of communications interface 1424 include a modem, a network interface (such as an Ethernet card), a communications port, a PCMCIA slot and card, etc. Software and data transferred via communications interface 1424 are in the form of signals 1428 which can be electronic, electromagnetic, optical or other signals capable of being received by communications interface 1424. These signals 1428 are provided to communications interface 1424 via a communications path (i.e., channel) 1426. Communications path 1426 carries signals 1428 and can be implemented using wire or cable, fiber optics, a phone line, a cellular phone link, an RF link, free-space optics, and other communications channels.

In this document, the terms "computer program medium" and "computer usable medium" are used to generally refer to media such as removable storage unit 1418, removable storage unit 1422, a hard disk installed in hard disk drive 1412, and signals 1428. These computer program products are means for providing software to computer system 1400. The invention, in an embodiment, is directed to such computer program products.

Computer programs (also called computer control logic or computer readable program code) are stored in main memory 1408 and/or secondary memory 1410. Computer programs can also be received via communications interface 1424. Such computer programs, when executed, enable the computer system 1400 to implement the present invention as discussed herein. In particular, the computer programs, when executed, enable the processor 1404 to implement the processes of the present invention, such as the method(s) implemented using, for example, portable controller 108, control screen 200, control screen 400, control screen 700, control screen 1000, and/or other system components of system 100 described above, such as methods 800 and/or 900, for example. Accordingly, such computer programs represent controllers of the computer system 1400.

In an embodiment where the invention is implemented using software, the software can be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover as previously discussed, it should be understood that the method, system, and computer program product of the present invention should not be limited to a residential environment. The present invention can be implemented in other types of environments having a central processing system for distributing media and sending command and/or control signals to a plurality of devices and/or applications dispersed throughout a designated region. In addition to a residence, the designated region includes, but is not limited to, office complexes, suite of small offices, production studios, warehouses, entertainment arenas, health care facilities, hotels, vacation resorts, aircrafts, ships, automobiles, or the like. Thus, the present invention should not be limited by any of the above-described exemplary embodiments, but should be defined only in accordance with the following claims and their equivalents.

What is claimed is:

1. A graphical user interface for managing a plurality of system components within a controlled environment, comprising:

a first set of control objects configured for selecting a system component within the controlled environment, wherein, activation of a control object from said first set denotes said selected system component and populates the user interface with control options, each control option is associated with a sequence of commands that, if executed, sends instructions to control the operations or functions of said selected system component;

a second set of control objects displayed concurrently with said control options associated with said selected system component, wherein, each control object within said second set of control objects is configured to allow viewing of the respective control object on the user interface and represents an affiliate system component and is configured to allow providing of an input to said selected system component, activation of a control object from said second set populates the user interface with control options for an affiliate system component associated with the activated control object from the second set, each control option for said affiliate system component is associated with a sequence of commands that, when executed, sends instructions to control operations or functions of said affiliate system component, and said control options for said affiliate system component are displayed concurrently with said second set of control objects on the user interface;

a third set of control objects representing one or more affiliate system components, the one or more affiliate system components configured to provide an input to said selected system component, and wherein the third set of control objects are configured to be pre-configured by a user to be hidden from display on the user interface; and device definition device configured to specify associations among one or more affiliate system components and a primary system component, and thereby establishing a chain of system components including said primary system component and said one or more affiliate system components, wherein said primary system component is associated with a primary control object from said first set, wherein activation of said primary control object populates the user interface with control options for executing commands to send instructions to control operations or functions of said chain of system components.

2. The graphical user interface of claim 1, wherein said first set of control objects represents a plurality of component types within the controlled environment.

3. The graphical user interface of claim 1, wherein said second set of control objects represents a plurality of component types within the controlled environment.

4. The graphical user interface of claim 1, further comprising means for configuring affiliated system components for viewing as control objects in said second set of control objects by selecting from all available affiliated system components those affiliated system components that should be displayed on the user interface.

5. The graphical user interface of claim 1, further comprising means for configuring affiliated system components for viewing as control objects in said second set of control objects by selecting all available affiliated system components those affiliated system components that should be hidden from display on the user interface.

6. The graphical user interface of claim 1, further comprising means for providing proxy control options for controlling one or more affiliated system components associated with the selected activity but pre-configured by the user to be hidden from display on the user interface.

7. A method of managing a plurality of system components within a controlled environment, comprising:
- presenting, on a user interface, a first set of control objects, each object being associated with one or more system components within the controlled environment;
- selecting a system component in response to receiving an activation signal associated with a control object from said first set;
- populating said user interface with control options for the selected system component;
- associating each control option with a sequence of executable commands that sends instructions to control operations or functions of the selected system component;
- presenting, on said user interface concurrently with said control options associated with said selected system component, a second set of control objects, wherein each control object within said second set of control objects represents an affiliate system component and configured to allow providing of an input to the selected system component configured for viewing on said user interface;
- presenting, on said user interface concurrently with said second set of control objects, control options for an affiliate system component in response to activating a control object from said second set;
- hiding from display on the user interface one or more affiliate system components, but are pre-configured by a user not to be displayed;
- associating control options for each affiliate system component configured for viewing on the user interface with a sequence of executable commands that sends instructions to control operations or functions of said affiliate system component configured for viewing on the user interface and said one or more affiliate system components configured by a user not to be displayed on the user interface;
- associating the control options for the selected system component with a sequence of executable commands that sends instructions to control operations or functions of the selected system component and/or the one or more affiliate system components configured by a user not to be displayed on the user interface; and
- specifying associations among one or more affiliate system components and a primary system component, and thereby establishing a chain of system components including said primary system component and said one or more affiliate system components, wherein said primary system component is associated with a primary control object from said first set, wherein activation of said primary control object populates said user interface with control options for executing commands to send instructions to control operations or functions of said chain of system components.

8. The method of claim 7, wherein said first set of control objects represents a plurality of component types within the controlled environment.

9. The method of claim 7, further comprising:
- selecting one or more control objects from said first set to designate system components, wherein said system components can operate in either an on or off state;
- presenting, on said user interface, a switch object that, when activated, executes a global command for the designated system components; and
- executing said global command to send instructions to alter the on-off state of the designated system components.

10. The method of claim 7, further comprising:
- selecting one or more control objects from said first set to designate a component type;
- presenting, on said user interface, a switch object that, when activated, executes a global command for one or more system components matching said component type, wherein said system components can operate in either an on or off state; and executing said global command to send instructions to alter the on-off state of said one or more system components matching said component type.

11. The method of claim 7, further comprising:
- selecting one or more control objects from said first set to designate system components, wherein said system components can operate in either an on or off state;
- presenting, on said user interface concurrently with said first set, a switch object that, when activated, executes a global command for the designated system components;
- exempting from said global command at least one of one or more specified system components, one or more system components matching a specified component type, and one or more system components positioned within a specified region within the controlled environment; and
- executing said global command to send instructions to alter the on-off state of all designated system components except for the exempted one or more system components.

12. The method of claim 7, wherein said second set of control objects represents a plurality of component types within the controlled environment.

13. The method of claim 7, further comprising configuring affiliated system components for viewing as control objects in said second set of control objects, including selecting from all available affiliated system components those affiliated system components that should be displayed on said user interface.

14. The method of claim 7, further comprising configuring affiliated system components for viewing as control objects in said second set of control objects, including selecting from all available affiliated system components those affiliated system components that should be hidden from display on said user interface.

15. The method of claim 7, further comprising providing proxy control options for controlling one or more affiliated system components associated with the selected activity but pre-configured by the user to be hidden from display on the user interface.

16. A computer program product comprising a computer useable medium having computer readable program code means embedded in said medium for causing a computer to manage a plurality of system components within a controlled environment, comprising:
- first computer readable program code means for presenting, on a user interface, a first set of control objects, each object being associated with one or more system components within the controlled environment;
- second computer readable program code means for selecting a system component in response to receiving an activation signal associated with a control object from said first set;
- third computer readable program code means for populating said user interface with control options for the selected system component;
- fourth computer readable program code means for associating each control option with a sequence of executable commands that sends instructions to control operations or functions of the selected system component;

fifth computer readable program code means for presenting, on said user interface concurrently with said control options associated with the selected system component, a second set of control objects, wherein each control object within said second set of control objects is configurable for viewing on said user interface and represents an affiliate system component configured to allow providing of an input to the selected system component;

sixth computer readable program code means for presenting, on said user interface concurrently with said second set of control objects, control options for an affiliate system component in response to activating a control object from said second set;

seventh computer readable program code means for associating each control option for said affiliate system component with a sequence of executable commands that sends instructions to control the operations or functions of said affiliate system component;

eighth computer readable program code for hiding from display on the user interface one or more affiliate system components, but are pre-configured by a user not to be displayed;

ninth computer readable program code means for associating one or more affiliate system components and a primary system component, and thereby establishing a chain of system components including said primary system component and said one or more affiliate system components, wherein said primary system component is associated with a primary control object from said first set, wherein activation of said primary control object populates said user interface with control options for executing commands to send instructions to control operations or functions of said chain of system components.

17. The computer program product of claim 16, further comprising computer readable program code means for configuring affiliated system components for viewing as control objects in said second set of control objects by selecting from all available affiliated system components those affiliated system components that should be displayed on said user interface.

18. The computer program product of claim 16, further comprising computer readable program code means for configuring affiliated system components for viewing as control objects in said second set of control objects by selecting from all available affiliated system components those affiliated system components that should be hidden from display on said user interface.

19. The computer program product of claim 16, further comprising computer readable program code means for providing proxy control options for controlling one or more affiliated system components associated with the selected activity but pre-configured by the user to be hidden from display on the user interface.

* * * * *